US011030000B2

(12) United States Patent
Ould-Ahmed-Vall

(10) Patent No.: US 11,030,000 B2
(45) Date of Patent: Jun. 8, 2021

(54) CORE ADVERTISEMENT OF AVAILABILITY

(71) Applicant: Intel Corporation, Santa Clara, CA (US)

(72) Inventor: Elmoustapha Ould-Ahmed-Vall, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 156 days.

(21) Appl. No.: 16/457,966

(22) Filed: Jun. 29, 2019

(65) Prior Publication Data

US 2020/0409750 A1 Dec. 31, 2020

(51) Int. Cl.
*G06F 9/48* (2006.01)
*G06F 11/30* (2006.01)

(52) U.S. Cl.
CPC ........ *G06F 9/4881* (2013.01); *G06F 11/3024* (2013.01); *G06F 11/3055* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 5,095,526 A | 3/1992 | Baum | |
| 5,497,497 A | 3/1996 | Miller et al. | |
| 5,752,071 A | 5/1998 | Tubbs et al. | |
| 5,828,875 A | 10/1998 | Halvarsson et al. | |
| 6,247,109 B1 | 6/2001 | Kleinsorge et al. | |
| 7,395,410 B2 | 7/2008 | Maeda et al. | |
| 7,873,814 B1 | 1/2011 | Cohen et al. | |
| 8,161,482 B1 | 4/2012 | Sakarda | |
| 8,438,306 B2 | 5/2013 | De et al. | |
| 8,930,722 B2 | 1/2015 | Sprangle et al. | |
| 9,111,051 B2 | 8/2015 | Hanyu et al. | |
| 9,483,318 B2 | 11/2016 | Vajapeyam | |
| 9,720,730 B2 | 8/2017 | Subbareddy et al. | |
| 9,829,965 B2 | 11/2017 | Hum et al. | |
| 10,310,897 B2 | 6/2019 | Drysdale et al. | |
| 10,552,207 B2 | 2/2020 | Tamir et al. | |
| 10,684,984 B2 | 6/2020 | Tamir et al. | |

(Continued)

FOREIGN PATENT DOCUMENTS

WO 2018/125250 A1 7/2018

OTHER PUBLICATIONS

European Search Report and Search Opinion, EP App. No. 20164747.6, dated Sep. 10, 2020, 10 pages.

(Continued)

*Primary Examiner* — Charlie Sun
(74) *Attorney, Agent, or Firm* — Nicholson De Vos Webster & Elliott LLP

(57) ABSTRACT

Embodiments involving core-to-core offload are detailed herein. For example, a method comprising: monitoring performance of a first core using performance monitoring circuitry; determining a core-to-core offload availability status of the first core based at least in part on values store in the performance monitoring circuitry; and transmitting an availability indication to a second core of an availability of the first core to act as a helper core to perform one or more tasks on behalf of the second core based upon the determined offload availability status of the first core is described.

20 Claims, 39 Drawing Sheets

(56) References Cited

U.S. PATENT DOCUMENTS

| | | |
|---|---|---|
| 2002/0198769 A1 | 12/2002 | Ratcliff |
| 2004/0012596 A1 | 1/2004 | Allen et al. |
| 2006/0010305 A1 | 1/2006 | Maeda et al. |
| 2006/0218556 A1 | 9/2006 | Nemirovsky et al. |
| 2010/0005474 A1 | 1/2010 | Sprangle et al. |
| 2011/0088041 A1 | 4/2011 | Alameldeen et al. |
| 2011/0320766 A1 | 12/2011 | Wu et al. |
| 2012/0110106 A1 | 5/2012 | De et al. |
| 2012/0260065 A1 | 10/2012 | Henry et al. |
| 2013/0073771 A1 | 3/2013 | Hanyu et al. |
| 2013/0191612 A1 | 7/2013 | Li et al. |
| 2013/0268943 A1 | 10/2013 | Solihin |
| 2014/0082630 A1 | 3/2014 | Subbareddy et al. |
| 2014/0165074 A1 | 6/2014 | Hrischuk et al. |
| 2014/0189332 A1 | 7/2014 | Ben-Kiki et al. |
| 2014/0304490 A1 | 10/2014 | Toyama et al. |
| 2015/0007196 A1 | 1/2015 | Toll et al. |
| 2015/0058650 A1 | 2/2015 | Varma et al. |
| 2015/0212892 A1 | 7/2015 | Li et al. |
| 2015/0220369 A1 | 8/2015 | Vajapeyam |
| 2016/0170849 A1 | 6/2016 | Cheng et al. |
| 2016/0378715 A1 | 12/2016 | Kang et al. |
| 2017/0068574 A1* | 3/2017 | Cherkasova .......... G06F 9/4881 |
| 2017/0083364 A1 | 3/2017 | Zhao et al. |
| 2017/0177415 A1 | 6/2017 | Dhanraj et al. |
| 2017/0185449 A1 | 6/2017 | Zhang et al. |
| 2017/0262281 A1 | 9/2017 | Bishop et al. |
| 2017/0286122 A1 | 10/2017 | Wu et al. |
| 2017/0364421 A1 | 12/2017 | Dusanapudi et al. |
| 2018/0089099 A1 | 3/2018 | Raj et al. |
| 2018/0095750 A1 | 4/2018 | Drysdale et al. |
| 2018/0095753 A1 | 4/2018 | Bai et al. |
| 2018/0113797 A1 | 4/2018 | Breslow et al. |
| 2018/0173529 A1 | 6/2018 | Tamir et al. |
| 2018/0173530 A1 | 6/2018 | Tamir et al. |
| 2018/0173674 A1 | 6/2018 | Tamir et al. |
| 2018/0365022 A1 | 12/2018 | Varma et al. |
| 2019/0163650 A1 | 5/2019 | Kim et al. |
| 2020/0036575 A1* | 1/2020 | Palavalli ............ G06F 11/2046 |

OTHER PUBLICATIONS

Intel Corporation, "Intel 64 and IA-32 Architectures Software Developer's Manual (Combined vol. 1, 2A, 2B, 2C, 3A, 3B, and 3C)", Sep. 2014, 3439 pages.

Intel Corporation, "Intel Architecture Instruction Set Extensions Programming Reference", Feb. 2016, 1180 pages.

Kurose et al., "Asynchronous Migration for Parallel Genetic Programming on a Computer Cluster With Multi-core Processors" 16th International Symposium on Artificial Life and Robotics, Oita, Japan, Jan. 27-29, 2011, pp. 533-536.

Non-Final Office Action, U.S. Appl. No. 16/458,035, dated Sep. 16, 2020, 8 pages.

Non-Final Office Action, U.S. Appl. No. 16/458,046, dated Sep. 25, 2020, 28 pages.

"A High Performance Load Balance Strategy for Real-Time Multicore Systems" by Keng-Mao Cho et al., Hindawi Publishing Corporation, The Scientific World Journal, vol. 2014. (Year: 2014).

"A Modern Multi-Core Processor—Lecture 2" from Parallel Computer Architecture and Programming CMU 15-418/15-618, Spring 2016. (Year: 2016).

"Optimization of the Load Balancing Policy for Tiled Many-Core Processors" by Ye Liu et al., Dec. 6, 2018. (Year: 2018).

"Saving Energy by Means of Dynamic Load Management in Embedded Multicore Systems" by Matthias Becker et al., Proceedings of the 9th IEEE International Symposium on Industrial Embedded Systems (SIES 2014), Pisa, 2014. (Year: 2014).

Non-Final Office Action, U.S. Appl. No. 16/458,038, dated Jul. 8, 2020, 16 pages.

Non-Final Office Action, U.S. Appl. No. 16/458,040, dated Jul. 14, 2020, 18 pages.

Non-Final Office Action, U.S. Appl. No. 16/457,970, dated Jul. 28, 2020, 8 pages.

European Search Report and Search Opinion, EP App. No. 20165090.0, dated Oct. 12, 2020, 11 pages.

Notice of Allowance, U.S. Appl. No. 16/458,040, dated Nov. 3, 2020, 10 pages.

\* cited by examiner

CODE TO EXECUTE ON CORE 0

LOOP1:
    OPERATIONS
ENDLOOP1

LOOP2:
    OPERATIONS
ENDLOOP1

LOOPN:
    OPERATIONS
ENDLOOPN

FIG. 1(A)

CODE TO EXECUTE ON CORE 0

OFFLOADREQ*
STARTOFFLOAD* CORE 1
// LOOP1:
//     OPERATIONS
// ENDLOOP1
//XSAVEOFFLOAD
//ENDOFFLOAD* CORE 0

LOOP2:
    OPERATIONS
ENDLOOP1

LOOPN:
    OPERATIONS
ENDLOOPN

CODE TO EXECUTE ON CORE 1

LOOP1:
    OPERATIONS
ENDLOOP1
XSAVEOFFLOAD
ENDOFFLOAD CORE 0

FIG. 1(B)

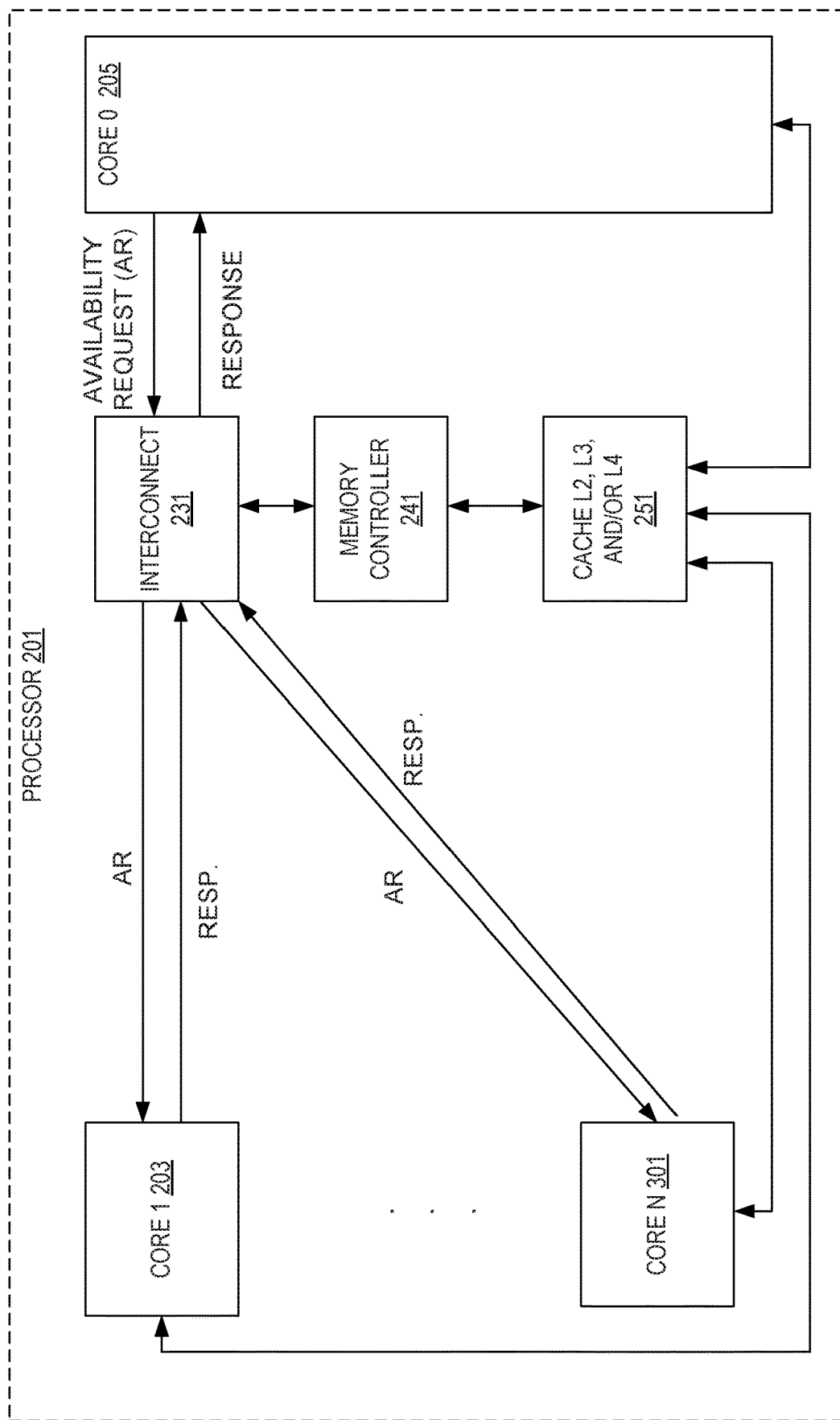

| OPCODE 401 | OPERAND 1 403 | OPERAND 2 405 | OPERAND 3 406 | IMMEDIATE 407 |
|---|---|---|---|---|
| OFFLOADREQ | DESTINATION(S) | REQUESTER ID | | |
| OFFLOADREQ | DESTINATION(S) | REQUESTER ID | [BOUNDING] | [BOUNDING] |
| OFFLOADREQ | [BOUNDING] | REQUESTER ID | [BOUNDING] | [BOUNDING] |
| OFFLOADREQ | REQUESTER ID | | | DESTINATION(S) |
| OFFLOADREQ | [BOUNDING] | [BOUNDING] | REQUESTER ID | DESTINATION(S) |
| OFFLOADREQBROADCAST | BOUNDING | REQUESTER ID | | |
| OFFLOADREQBROADCAST | REQUESTER ID | | | BOUNDING |

FIG. 4

| CORE 501 | HAS OFFLOAD TASK? 503 | OFFLOAD TASK SRC 505 | BOUND STATUS 507 | GIVEN OFFLOAD TASK TO CORE(S) 509 | LOCATION OF SAVED RESULT 511 | IP 513 | INIT. PROCESSOR STATE 515 |
|---|---|---|---|---|---|---|---|
| 0 | Y | 1 | COMPUTE | NULL | ADDRESS 1 | IP | ADDRESS 4 |
| 1 | N | NULL | COMPUTE | 0, 2 | 0, 2 | NULL | 0, 2 |
| 2 | Y | 1 | COMPUTE | NULL | ADDRESS 2 | IP | ADDRESS 5 |
| 3 | Y | 4 | NULL | 3 | ADDRESS 3 | IP | ADDRESS 6 |
| 4 | N | NULL | COMPUTE | NULL | NULL | NULL | NULL |
| 5 | N | NULL | MEMORY | NULL | NULL | NULL | NULL |
| 6 | N | NULL | I/O | NULL | NULL | NULL | NULL |
| 7 | N | NULL | NULL | NULL | NULL | NULL | NULL |

FIG. 5

FETCH AN INSTRUCTION HAVING FIELDS FOR AT LEAST AN OPCODE INDICATING AN OFFLOAD AVAILABILITY REQUEST OPERATION IS TO BE PERFORMED AND, IN SOME EMBODIMENTS ONE OR MORE OPERANDS 701

DECODE THE INSTRUCTION 703

EXECUTE THE DECODED INSTRUCTION ACCORDING TO THE OPCODE TO CAUSE CORE-TO-CORE OFFLOAD CIRCUITRY OR CORE-TO-CORE OFFLOAD FINITE STATE MACHINE TO GENERATE AND TRANSMIT AN OFFLOAD AVAILABILITY REQUEST THE OFFLOAD AVAILABILITY REQUEST INCLUDING ONE OR MORE OF: AN IDENTIFICATION OF THE REQUESTING CORE, AN IDENTIFICATION OF CORES TO RECEIVE THE REQUEST AS PROVIDED BY A OPERAND OF THE INSTRUCTION (IF NOT A BROADCAST VARIANT), AN INDICATION OF THE TYPE OF AVAILABILITY REQUESTED (E.G., COMPUTE, MEMORY, OR I/O), AND/OR AN INDICATION OF THE BOUNDING TYPE THAT IS HAMPERING THE REQUESTING CORE)
707

COMMIT A RESULT OF THE EXECUTED INSTRUCTION 709

FIG. 7

| CORE ID 1001 | HAS OFFLOAD TASK? 1003 | BOUNDING STATUS 1007 | DESTINATION ID 1009 | TIMESTAMP 1011 |
|---|---|---|---|---|
| 0 | Y | COMPUTE | NULL | 1:00 |
| 0 | Y | I/O | 3 | 0:01 |
| 0 | Y | MEMORY | NULL | 2:00 |
| 0 | Y | NULL | NULL | 3:00 |
| 0 | N | NULL | NULL | 4:00 |
| 0 | N | COMPUTE | NULL | 5:00 |
| 0 | N | MEMORY | NULL | 6:00 |
| 0 | N | I/O | NULL | 7:00 |

FIG. 10

| OPCODE 1601 | OPERAND 1 1603 | OPERAND 2 1605 | OPERAND 3 1607 | OPERAND 4 1609 | OPERAND 5 1611 |
|---|---|---|---|---|---|
| STARTOFFLOAD | ADDRESS TO FETCH | IP | REQUESTING CORE ID | HELPER CORE ID | REQUESTING CORE STATE LOCATION |
| STARTOFFLOAD | ADDRESS TO FETCH | IP | REQUESTING CORE ID | HELPER CORE ID | REQUESTING CORE STATE |
| STARTOFFLOADBRDCAST | ADDRESS TO FETCH | IP | REQUESTING CORE ID | REQUESTING CORE STATE LOCATION | |
| STARTOFFLOADBRDCAST | ADDRESS TO FETCH | IP | REQUESTING CORE ID | REQUESTING CORE STATE | |
| STARTOFFLOAD | | | | | |
| STARTOFFLOADBRDCAST | | | | | |

FIG. 16

| CORE ID 1701 | ADDRESS/TASK 1703 | DESTINATION ID 1705 | IP 1707 | CORE STATE OR LOCATION 1709 | TIMESTAMP 1711 |
|---|---|---|---|---|---|
| 0 | MEM ADDRESS 1 | 1 | IP | 1 | 1:00 |
| 0 | CACHE ADDRESS 1 | 2 | IP | 2 | 0:01 |

FIG. 17

FETCH AN INSTRUCTION HAVING FIELDS FOR AN OPCODE INDICATING AN OFFLOAD START OPERATION IS TO BE PERFORMED AND ONE OR MORE OPERANDS PROVIDING INFORMATION FOR THAT OPERATION 1801

DECODE THE INSTRUCTION 1803

RETRIEVE DATA ASSOCIATED WITH THE ONE OR MORE OPERANDS 1805

EXECUTE THE DECODED INSTRUCTION ACCORDING TO THE OPCODE TO CAUSE A GENERATION AND TRANSMIT OF AN OFFLOAD START REQUEST TO ONE OR MORE CORE(S) INDICATED BY THE ONE OR MORE OPERANDS OR AS A BROADCAST, THE OFFLOAD START REQUEST INCLUDING ONE OR MORE OF: AN IDENTIFIER OF THE CORE THAT IS REQUESTING THE OFFLOAD, A LOCATION OF WHERE THE HELPER CORE CAN FIND THE TASK TO PERFORM, THE TASK ITSELF, AN IDENTIFIER OF THE CORE(S) TO PERFORM THE OFFLOAD AS HELPER(S), AN INSTRUCTION POINTER FROM THE CODE, A PROCESSOR STATE, A PROCESSOR STATE LOCATION, AND/OR A TIMESTAMP

1807

COMMIT A RESULT OF THE EXECUTED INSTRUCTION 1809

FIG. 18

| OPCODE 2401 | OPERAND 1 2403 | OPERAND 6 2404 | OPERAND 2 2405 | OPERAND 3 2407 | OPERAND 4 2409 | OPERAND 5 2411 |
|---|---|---|---|---|---|---|
| ENDOFFLOAD | ADDRESS OF STORED RESULTS | HELPER CORE ID | IP | REQUESTING CORE ID | HELPER CORE ID | HELPER CORE STATE LOCATION |
| ENDOFFLOAD | ADDRESS OF STORED RESULTS | HELPER CORE ID | IP | REQUESTING CORE ID | HELPER CORE ID | HELPER CORE STATE |
| ENDOFFLOADBRDCAST | ADDRESS OF STORED RESULTS | HELPER CORE ID | IP | REQUESTING CORE ID | HELPER CORE STATE LOCATION | |
| ENDOFFLOADBRDCAST | ADDRESS OF STORED RESULTS | HELPER CORE ID | IP | REQUESTING CORE ID | HELPER CORE STATE | |
| ENDOFFLOADBRDCAST | REQUESTING CORE ID | HELPER CORE ID | | | | |
| ENDOFFLOAD | | | | | | |
| ENDOFFLOADBRDCAST | | | | | | |

FIG. 24

```
┌─────────────────────────────────────────────────────────────────────┐
│ FETCH AN INSTRUCTION HAVING FIELDS FOR AN OPCODE INDICATING AN OFFLOAD │
│ END OPERATION IS TO BE PERFORMED AND ONE OR MORE OPERANDS PROVIDING │
│ INFORMATION FOR THAT OPERATION 2501                                  │
└─────────────────────────────────────────────────────────────────────┘
                                    │
                                    ▼
┌─────────────────────────────────────────────────────────────────────┐
│ DECODE THE INSTRUCTION 2503                                         │
└─────────────────────────────────────────────────────────────────────┘
                                    │
                                    ▼
┌─────────────────────────────────────────────────────────────────────┐
│ RETRIEVE DATA ASSOCIATED WITH THE ONE OR MORE OPERANDS 2505         │
└─────────────────────────────────────────────────────────────────────┘
                                    │
                                    ▼
┌─────────────────────────────────────────────────────────────────────┐
│ EXECUTE THE DECODED INSTRUCTION ACCORDING TO THE OPCODE TO CAUSE A   │
│ GENERATION AND TRANSMIT OF AN OFFLOAD END INDICATION TO THE CORE THAT│
│ HAD REQUESTED THE OFFLOAD, THE INDICATION INCLUDING ONE OR MORE OF AN│
│ IDENTIFIER OF THE CORE THAT HAD REQUESTED THE OFFLOAD, A LOCATION OF │
│ WHERE THE OFFLOAD REQUESTING CORE CAN FIND THE RESULTS OF THE OFFLOAD,│
│ THE RESULTS OF THE OFFLOAD, AN INSTRUCTION POINTER AS PROVIDED WITH A│
│ CORRESPONDING STARTOFFLOAD REQUEST, A CORE STATE, AND/OR A CORE STATE│
│ LOCATION;                                                            │
│ 2507                                                                 │
└─────────────────────────────────────────────────────────────────────┘
                                    │
                                    ▼
┌─────────────────────────────────────────────────────────────────────┐
│ COMMIT A RESULT OF THE EXECUTED INSTRUCTION 2509                    │
└─────────────────────────────────────────────────────────────────────┘
```

FIG. 25

```
┌─────────────────────────────────────────────────────────────────┐
│ FETCH AN INSTRUCTION HAVING FIELDS FOR AN OPCODE INDICATING AN  │
│ OFFLOAD END OPERATION IS TO BE PERFORMED  2601                  │
└─────────────────────────────────────────────────────────────────┘
                                  │
                                  ▼
┌─────────────────────────────────────────────────────────────────┐
│ DECODE THE INSTRUCTION 2603                                     │
└─────────────────────────────────────────────────────────────────┘
                                  │
                                  ▼
┌─────────────────────────────────────────────────────────────────┐
│ RETRIEVE DATA ASSOCIATED WITH THE ONE OR MORE OPERANDS 2605     │
└─────────────────────────────────────────────────────────────────┘
                                  │
                                  ▼
┌─────────────────────────────────────────────────────────────────┐
│ EXECUTE THE DECODED INSTRUCTION ACCORDING TO THE OPCODE TO      │
│ CAUSE A GENERATION AND TRANSMIT OF AN OFFLOAD END INDICATION    │
│ BY THE **CORE-TO-CORE OFFLOAD CIRCUITRY OR CORE-TO-CORE         │
│ OFFLOAD FINITE STATE MACHINE** TO THE CORE THAT HAD REQUESTED   │
│ THE OFFLOAD, THE INDICATION INCLUDING ONE OR MORE OF AN         │
│ IDENTIFIER OF THE CORE THAT HAD REQUESTED THE OFFLOAD, A        │
│ LOCATION OF WHERE THE OFFLOAD REQUESTING CORE CAN FIND THE      │
│ RESULTS OF THE OFFLOAD, THE RESULTS OF THE OFFLOAD, AN          │
│ INSTRUCTION POINTER AS PROVIDED WITH A CORRESPONDING            │
│ STARTOFFLOAD REQUEST, A CORE STATE, AND/OR A CORE STATE         │
│ LOCATION                                                        │
│ 2607                                                            │
└─────────────────────────────────────────────────────────────────┘
                                  │
                                  ▼
┌─────────────────────────────────────────────────────────────────┐
│ COMMIT A RESULT OF THE EXECUTED INSTRUCTION  2609               │
└─────────────────────────────────────────────────────────────────┘
```

FIG. 26

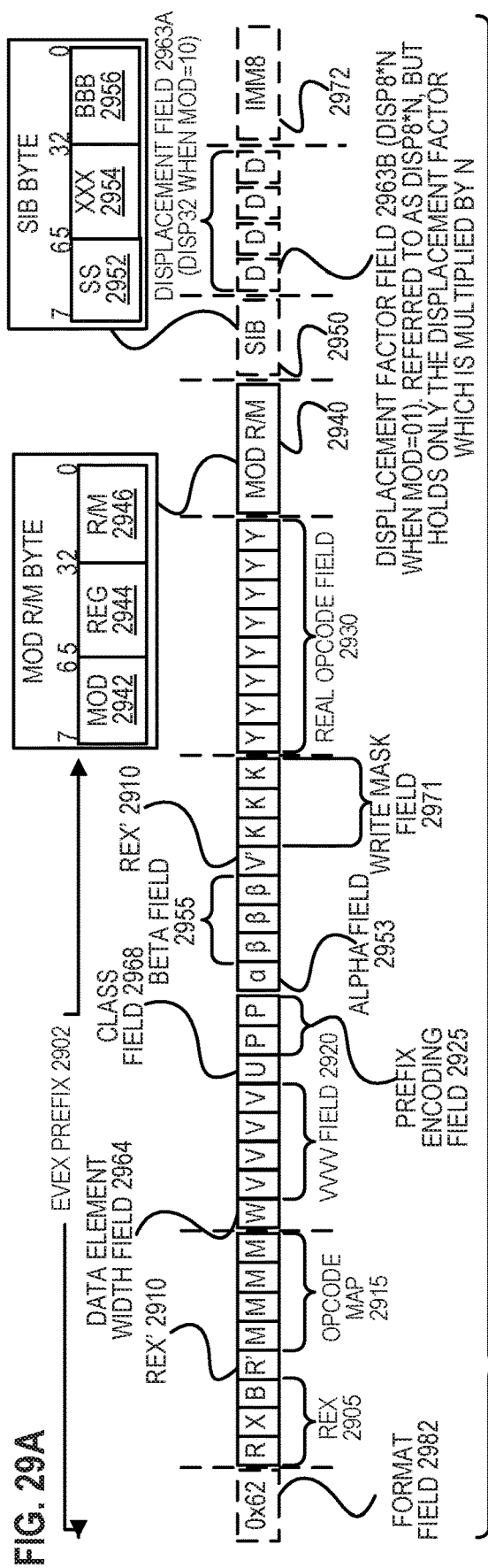
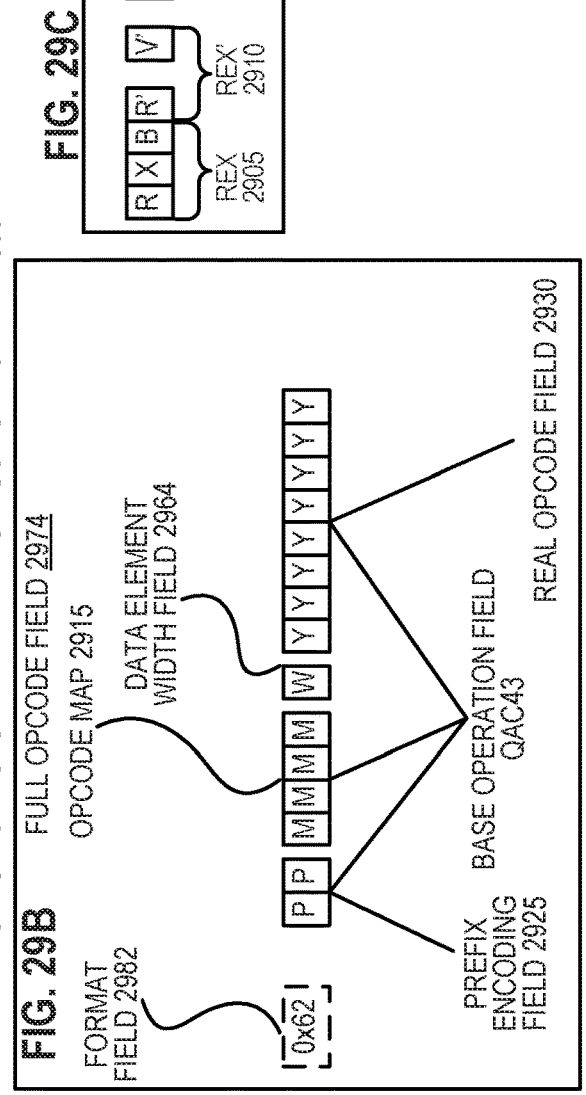

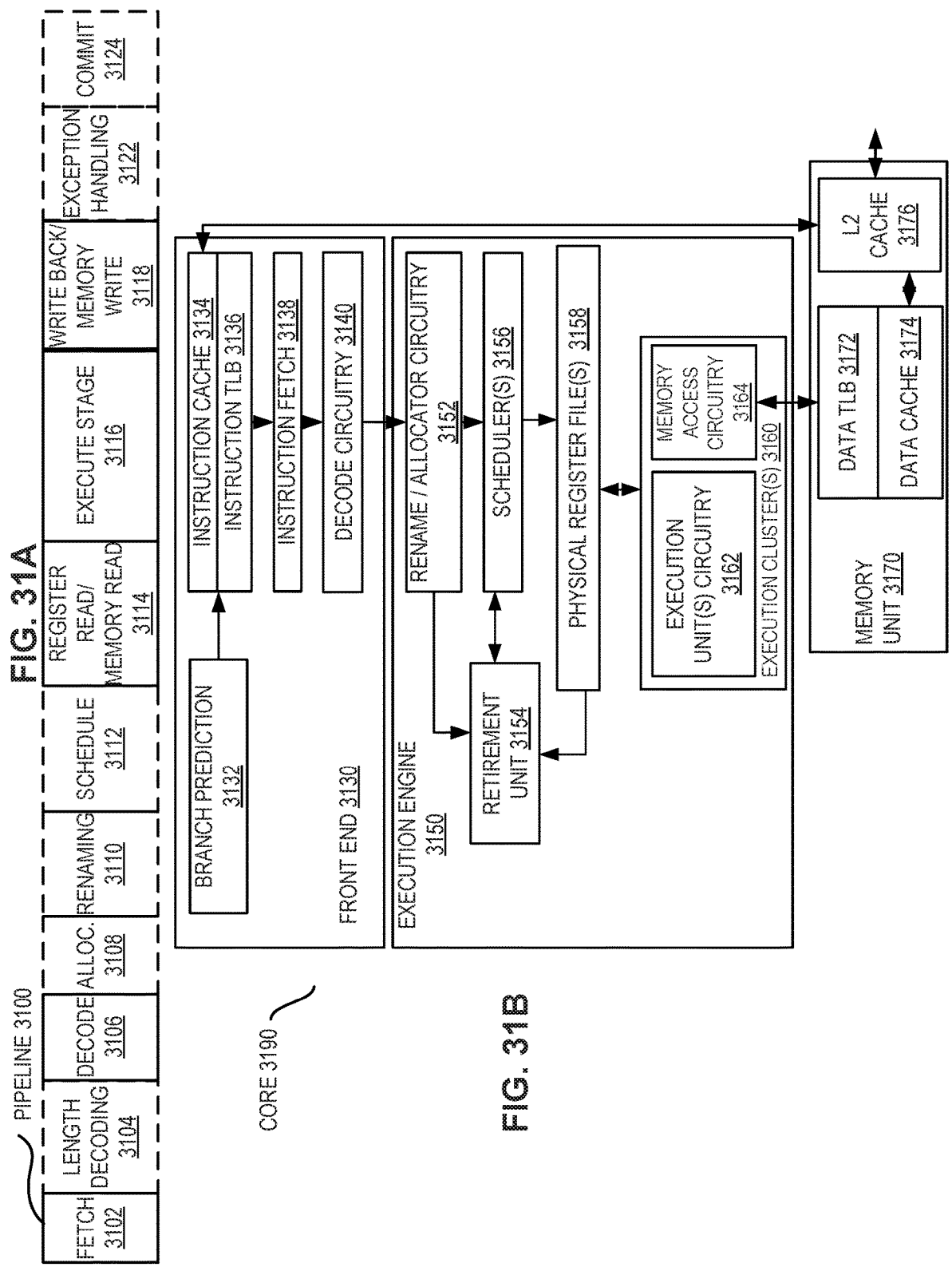

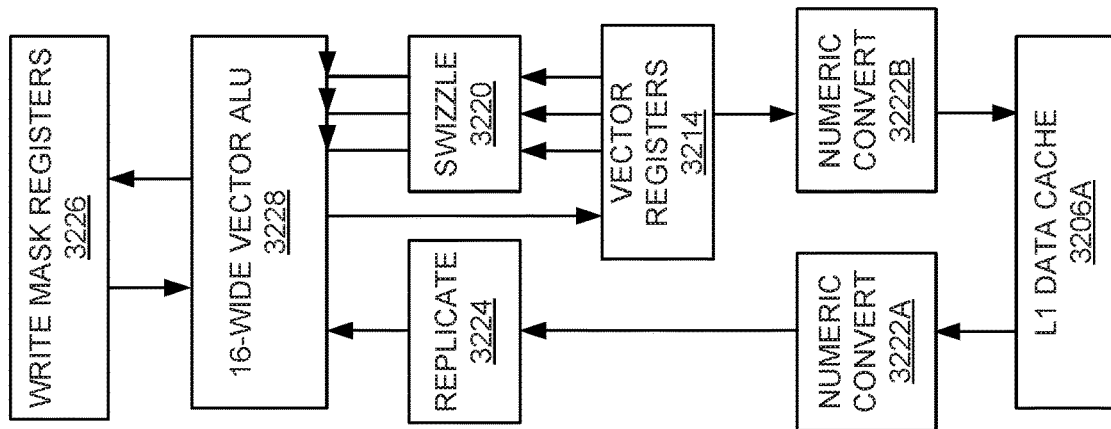
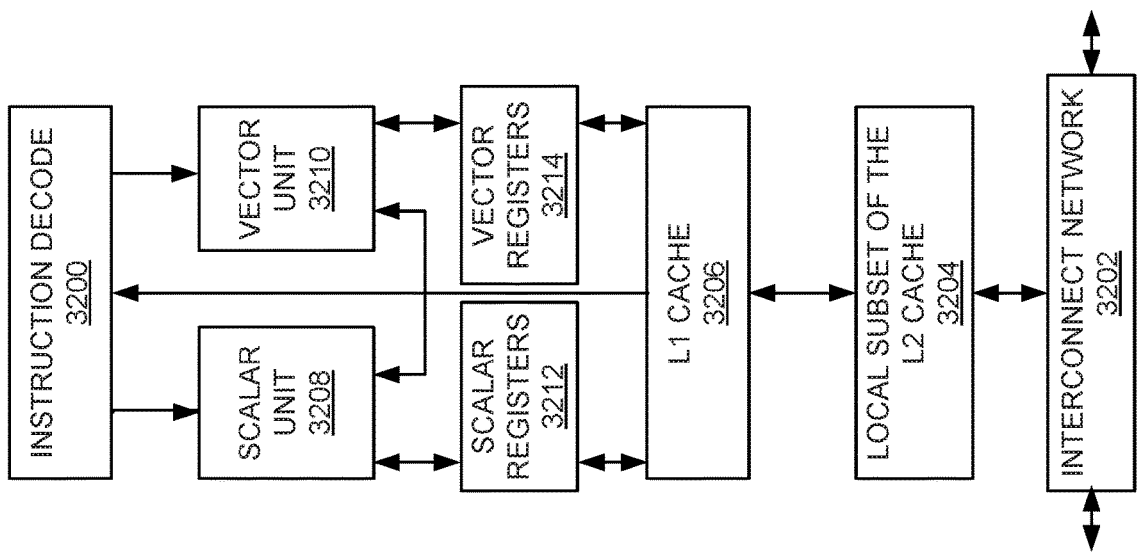

CORE ADVERTISEMENT OF AVAILABILITY

BACKGROUND

There are several examples of moving work or tasks from a processor core to a different processor core or to an accelerator. Typically, the operating system is the entity that causes this movement. For example, as an operating system scheduler can see what is executing in an entire system, when the load changes in a particular component it can shift operands. This shift may include powering down the original execution component. In other examples, cores of different capabilities are paired and when the demand is high the more complex core runs and when the demand is low the relatively less complex core runs the code. Further, thread priority as known by the operating system may influence who executes at a given point in time.

BRIEF DESCRIPTION OF THE DRAWINGS

Various embodiments in accordance with the present disclosure will be described with reference to the drawings, in which:

FIG. 1(A) illustrates an example of code that is to execute on a single core.

FIG. 1(B) illustrates an example of the code of FIG. 1(A), but with a portion of that code to potentially be executed by a second core as a task.

FIG. 3 illustrates embodiments of at least three cores and common components shared by these cores where one of the three cores are requesting an indication of offload availability from the other core.

FIG. 4 illustrates embodiments of various offload availability request instruction variants.

FIG. 5 illustrates embodiments of an offload phase tracker data structure. While a plurality of fields is shown, depending upon the implementation, not all of the fields are utilized or additional fields are included.

FIG. 7 illustrates embodiments of a method of processing an offload availability request instruction (OFFLOAD-REQ*).

FIG. 10 illustrates examples of an offload availability advertisement according to some embodiments.

FIG. 16 illustrates embodiments of various offload start instruction variants.

FIG. 17 illustrates examples of an offload start request according to some embodiments.

FIG. 18 illustrates embodiments of a method of processing a startoffload* instruction.

FIG. 24 illustrates embodiments of various offload end instruction variants.

FIG. 25 illustrates embodiments of a method of processing an endoffload* instruction.

FIG. 26 illustrates embodiments of a method of processing an endoffload* instruction.

FIG. 29A is a block diagram illustrating an exemplary instruction format according to embodiments of the invention.

FIG. 29B is a block diagram illustrating the fields of the instruction format that make up the full opcode field according to one embodiment of the invention.

FIG. 29C is a block diagram illustrating the fields of the instruction format that make up the register index field according to one embodiment of the invention.

FIG. 31A is a block diagram illustrating both an exemplary in-order pipeline and an exemplary register renaming, out-of-order issue/execution pipeline according to embodiments of the invention.

FIG. 31B is a block diagram illustrating both an exemplary embodiment of an in-order architecture core and an exemplary register renaming, out-of-order issue/execution architecture core to be included in a processor according to embodiments of the invention.

FIGS. 32A-B illustrate a block diagram of a more specific exemplary in-order core architecture, which core would be one of several logic blocks (including other cores of the same type and/or different types) in a chip.

DETAILED DESCRIPTION

Figure 2:
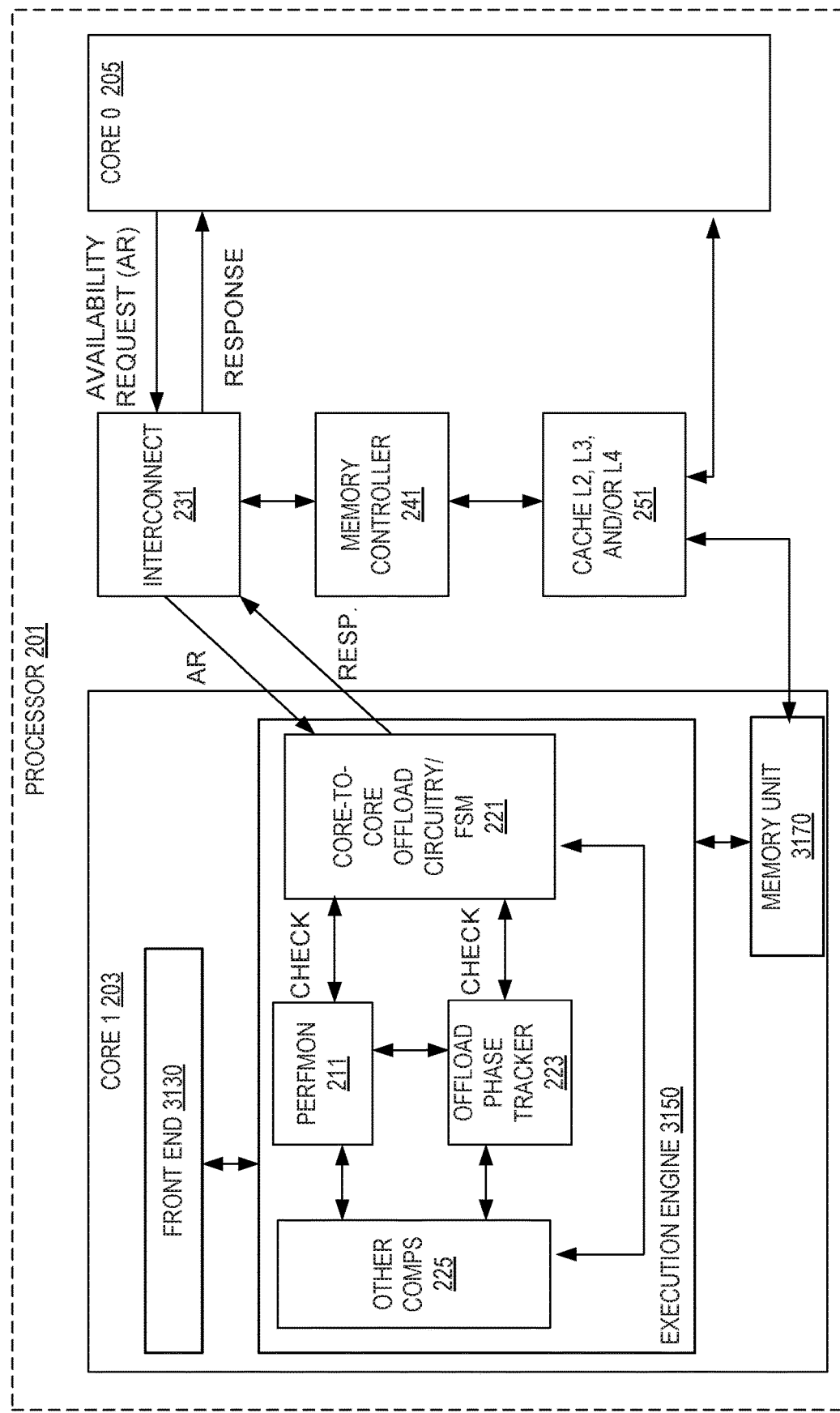
FIG. 2 illustrates embodiments of at least two cores and common components shared by these cores where one of the two cores is requesting an indication of offload availability from the other core.

Various embodiments of methods, apparatus, systems, and non-transitory computer-readable storage media for core-to-core offload of one or more tasks are described. In particular, a task (e.g., some proper subset of code such as a sub-portion of a loop, a loop, etc.) that was to execute on a first core is instead executed on at least a second core as a helper core (in other words, offloaded from the first core to at least the second core). The second core executes the task and makes the result available to the first core for the first core to use in subsequent processing.

As there are times when a processor core is not fully compute, memory, and/or input/output (I/O) constrained without core-to-core offload there may be cycles of that core left behind. In the above scenario, the second core is not fully constrained and could handle additional work and the first core could use some help in getting the work done more efficiently (in terms of time and/or energy). Additionally, some schemes push out work to a graphics processing unit (GPU) when a core of a central processing unit (CPU) cores runs into a bottleneck or because that is a traditional type of offload. This is unlikely to be power efficient as GPUs tend to use significantly more power than even a fully loaded CPU.

As noted in the background, traditional migration involves an offload of shared code to an accelerator such as a GPU or to a heterogenous core. In either case, the operating system was involved in that offload. Individual cores were not aware if they could handle work from other cores and were reliant on the operating system (OS). Involving the OS in the offload means that any offload has to deal with the inefficiencies of approval from the OS.

Embodiments detailed herein provide one or more mechanisms for such offloading without requiring an operating system to be involved. As such, the cores themselves are aware of what work they can and cannot handle. Typically, the OS is not informed of this offload. However, in some embodiments a core may tell an operating system scheduler to hold off on scheduling new work while it is acting as a helper core, the OS does not tell a core that it cannot send work to another core. Without involving the OS, the core-to-core offload described herein is more efficient.

FIG. 1(A) illustrates an example of code that is to execute on a single core. As shown, the code includes at least three loops to execute on core 0. In this example, at least some of the loops can be executed independent of the other loops (as in LOOP2 does not need a result from LOOP1). Such independence is an indication that each loop could be considered as task to offload.

FIG. 1(B) illustrates an example of the code of FIG. 1(A), but with a portion of that code to potentially be executed by a second core as a task. As shown, the original code has been modified (typically, a compiler would do this modification, however, this could be done manually or through binary translation) to include "core-to-core" instructions which may allow for the task of LOOP1 to migrate from core 0 to core 1. In this example, several different operations are added to the code and one or more of these instructions will be discussed in detail below. These operations may be instructions that are programmer visible (such as added by a compiler) or non-visible operations that the cores perform on their own. As such, while the OFFLOADREQ*, STARTOFFLOAD*, XSAVEOFFLOAD, and/or ENDOFFLOAD* are described as user visible instructions, in some embodiments, the OFFLOADREQ*, STARTOFFLOAD*, XSAVEOFFLOAD, and/or ENDOFFLOAD* are simply operations performed by the core. Note the discussion for this figure will use "instruction."

The first new instruction or operation is "OFFLOADREQ*" which, when executed, causes a request from core 0 to be sent to core 1 to ask if core 0 can offload a task to core 1 such that core 1 acts as a helper core to core 0. Core 1 is to respond about its status to OFFLOADREQ*.

STARTOFFLOAD* indicates that core 1 is to receive an offload task (e.g., LOOP1) from core 0. In some embodiments, STARTOFFLOAD* is directed to a particular core (here core 1) or causes a broadcast that sends the request to all cores to start a task.

LOOP1, its operations, the end of the loop determination (ENDLOOP1), a context save operation (XSAVEOFFLOAD), and an ENDOFFLOAD* are all shown in the code of core 0 as being commented out with //. This indicates they will not be executed on core 0, but will be executed on core 1.

On core 1, once LOOP1 is complete (through ENDLOOP1), the XSAVEOFFLOAD stores the result(s) of LOOP1 into one or more memory locations accessible to core 0 (such as in a shared cache or memory). The one or more memory locations may have been provided by core 0. In some embodiments, XSAVEOFFLOAD causes an indication of where this location is to the parent or requesting core (here core 0).

When ENDOFFLOAD* is performed on core 1, it causes an indication to be sent back to core 0 letting core 0 know that the task is complete, and, in some embodiments, where the result is (if any and if not included in the indication), etc., thus allowing core 0 to integrate the result of the execution of LOOP1 performed by core 1 into its execution of the remainder of the code.

Note that if OFFLOADREQ*, STARTOFFLOAD*, XSAVEOFFLOAD, and/or ENDOFFLOAD* are not supported by the core, their inclusion should result in no-ops or whatever the core does with unsupported instructions. As such, all of the loops of code would run on core 0 just as FIG. 1(A). Note this allows this functionally to be added to cores without breaking backward compatibility.

FIG. 2 illustrates embodiments of at least two cores and common components shared by these cores where one of the two cores is requesting an indication of offload availability from the other core. In some embodiments, these cores (core 1 203 and core 0 205) are a part of single processor 201. In other embodiments, the cores are on different processors, but accessible to each other via an interconnect or fabric 231. Note that the interconnect of fabric 231 may also be internal to a processor such as a point-to-point interconnect between cores, a cross-bar, or ring.

Note that the internal aspects of core 0 205 are not shown, but they mirror core 1 201.

Core 1 203 and core 0 205 share the interconnect 231 and depending on the implementation also share a memory controller 241 and one or more levels of cache (L2, L3, and/or L4).

In this illustration, core 0 205 would like to know if core 1 203 is available to act as a helper core and take an offloaded task. Note what is not shown in this figure is an interposing operating system to handle the offload or the offload availability request.

As shown, core 0 205 sends an offload availability request (AR) through an interconnect 231 (such as a ring interconnect, point-to-point, fabric, etc.) to core 1 203. Core 1 203 ingests the AR and determines what its availability is to be a helper core. Like all cores, core 1 203 includes a front end 3130 (detailed later), an execution engine 3150 (more aspects of which are detailed later), and a memory unit 3170 (detailed later). Core 1 203 (and core 0 205) further includes core-to-core offload circuitry or core-to-core offload finite state machine (FSM) 221 to coordinate core-to-core offloads. When an FSM is used, it is typically code executing on a microcontroller of some sort.

The core-to-core offload circuitry or core-to-core offload finite state machine 221 couples to performance monitoring circuitry 211 which monitors performance of the core. For example, the performance monitoring circuitry 211 may count one or more of a number of instructions of any type retired, a number of unhalted core cycles, a number of cache misses, a number of cache access, a number of branch instructions retired, a number of branch misses retired, and/or a number of available slots. Note that in some embodiments, what is to be monitored is configurable. What is monitored may be used to determine a bounding of the core. For example, memory and cache counts may be used to determine if a core is memory bound, instruction counts may indicate the core being compute bound, etc.

The core-to-core offload circuitry or core-to-core offload finite state machine 221 also couples to (or includes) an offload phase tracker 223 which tracks the status of cores with respect to offload status. A more detailed discussion of an exemplary offload phase tracker 223 data structure will be discussed with respect to FIG. 5. In some embodiments, the offload phase tracker 223 updates its offload phase tracker data structure(s) dependent upon the performance monitoring circuitry 211. In other embodiments, the core-to-core offload circuitry or core-to-core offload finite state machine 221 updates the offload phase tracker data structure(s) using, for example, the performance monitoring circuitry 211 and/or information provided from other cores (such as when a core accepts an offload it may alert other cores of the change in its status, or when a core accepts an offload from core 1 203 the offload phase tracker data structure(s) would be updated.

The core-to-core offload circuitry or core-to-core offload finite state machine 221 uses information from the performance monitoring circuitry 211 and/or offload phase tracker 223 to determine if core 1 203 is available to act as a helper core. For example, if core 0 205 is compute bound and core 1 203 is not (based, for example, on the performance monitoring circuitry 211 values), then core 1 203 can probably help. If core 1 203 were to also be compute bound it would likely not be able to help. When the cores are not homogeneous, the core-to-core offload circuitry or core-to-core offload finite state machine 221 may also deny being a helper if it does not support at least a proper subset of the same instruction set architecture. However, in most instances, it is the type of bounding of the core that dictates if it can help.

Note that other components 225 of the execution engine are described in detail with respect to FIG. 3150. While shown as being a part of the execution engine 3160, in some embodiments, one or more of the offload phase tracker 223, the core-to-core offload circuitry or core-to-core offload FSM 221, and the performance monitoring circuitry 211 are in another area of the core.

Once the core-to-core offload circuitry or core-to-core offload finite state machine 221 determines if it can help, it causes a response to be sent from core 1 203 to at least core 0 205 indicating is availability status (available or not) through the interconnect 231. Core 0 205 then uses that information to help determine which core(s) it will ask to help (assuming multiple cores).

FIG. 3 illustrates embodiments of at least three cores and common components shared by these cores where one of the three cores are requesting an indication of offload availability from the other core. This example is similar to FIG. 2, but the AR is a broadcast to a plurality of cores. In this example, that includes core 1 203 as in FIG. 2 and additionally core N 301. While a broadcast may occupy more bandwidth of the interconnect, it may allow for more up to date information of all cores for core 0 205 to use when deciding who to send one or more tasks to.

FIG. 4 illustrates embodiments of various offload availability request instruction variants. Note that not all instruction configurations are shown. However, each instruction has an opcode 401 to indicate if the offload availability request (such as the AR detailed above) is to be individually addressed (e.g., OFFLOADREQ) or broadcast (e.g., OFFLOADREQBROADCAST).

Each instruction also has fields to identify one or more operands such as operand 1 403 and operand 2 405 and/or a field for an immediate 407. The use (content) of those operands and/or immediate may change. Note that operand 1 403, operand 2 405, and/or operand 3 406 may be registers or memory locations. In some embodiments, each instruction uses the operands or immediate to provide the requesting core's identification and/or an example of bounding condition that will not work in one of the operands or immediate. In other embodiments, each instruction uses the operands or immediate to provide the requesting core's identification and/or an example of bounding condition that is limiting the requesting core. None broadcast variants also include an indication of one or more destinations in a operand or immediate.

The first instruction variant includes an operand 1 403 field to identify one or more destinations (e.g., specific cores to receive the offload availability request). For example, in some embodiments, a register or memory location includes a plurality of data elements with each data element corresponding to a core such that when a data element is set that core is to receive the offload availability request (e.g., XMM1[0]=1 indicates that core 0 is to receive the request whereas XMM1[1]=0 indicates that core 1 is to not receive the request). In other embodiments, individual bits of a register or memory location are utilized in similar manner (e.g., GPReg1[0]=1 indicates that core 0 is to receive the request whereas GPReg1[1]=0 indicates that core 1 is to not receive the request). In some embodiments, the instruction includes the requesting core's identification in operand 2 405. This allows the receiving core to determine who sent the request.

The second instruction variant includes an operand 1 403 field to identify one or more destinations (e.g., specific cores to receive the offload availability request). For example, in some embodiments, a register or memory location includes a plurality of data elements with each data element corresponding to a core such that when a data element is set that core is to receive the offload availability request (e.g., XMM1[0]=1 indicates that core 0 is to receive the request whereas XMM1[1]=0 indicates that core 1 is to not receive the request). In other embodiments, individual bits of a register or memory location are utilized in similar manner (e.g., GPReg1[0]=1 indicates that core 0 is to receive the request whereas GPReg1[1]=0 indicates that core 1 is to not receive the request).

In some embodiments, the instruction includes the requesting core's identification in operand 2 405. This instruction further includes, in some embodiments, an indication of the bounding type in either operand 2 405 or immediate 407 that will not work. For example, compute bound, memory bound, or I/O bound. In other embodiments, an indication of the bounding type that the requesting core is suffering from is included in either operand 2 405 or immediate 407.

The third instruction variant does not use a field to identify a destination. This may occur when there are only two cores in a system. In some embodiments, the instruction includes the requesting core's identification in operand 2 405 (or any of the operands). This instruction further includes an indication of the bounding type in either operand 1 405, operand 3 406, or immediate 407 that will not work. For example, compute bound, memory bound, or I/O bound. In other embodiments, an indication of the bounding type that the requesting core is suffering from is included in in those fields.

The fourth instruction variant uses the immediate 407 field to identify a destination with bits of the immediate corresponding to a core number (e.g., IMM[0]=core 0). In some embodiments, the instruction includes the requesting core's identification in operand 2 405 (or any of the operands).

The fifth instruction variant uses the immediate 407 field to identify a destination with bits of the immediate corresponding to a core number (e.g., IMM[0]=core 0). In some embodiments, the instruction includes the requesting core's identification in operand 3 406 (or any of the operands). This instruction further includes an indication of the bounding type in either operand 1 405 or operand 2 405. For example, compute bound, memory bound, or I/O bound. In other embodiments, an indication of the bounding type that the requesting core is suffering from is included in in those fields. In some embodiments, the instruction includes the requesting core's identification in operand 3 406 (or any of the operands).

The sixth instruction variant is a broadcast version and uses one of the operands (such as operand 2 405) to identify the requesting core's identification in operand 2 405. Another of the operands (such as operand 1 403) is used to identify a bounding type (either what is hampering the requesting core or what type of bounding will not work depending on the implementation).

The seventh instruction variant is a broadcast version and uses one of the operands (such as operand 1 403) to identify the requesting core's identification in operand 2 405. The immediate is used to identify a bounding type (either what is hampering the requesting core or what type of bounding will not work depending on the implementation).

Note that these examples are not exhaustive. However, each of the OFFLOADREQ* instructions includes an opcode uses one or more operands or the immediate to provide one or more of an indication of destination(s), requester ID, and/or bounding and, as such, other variants are possible.

FIG. 5 illustrates embodiments of an offload phase tracker data structure. While a plurality of fields is shown, depending upon the implementation, not all of the fields are utilized or additional fields are included. Further, the illustrated data structure is broken into individual data structures per core in some embodiments. For example, each field of is a data element of a vector register, etc.

Typically, each entry includes a field for a core identifier 501 that is accessible. For example, each core in a processor.

In some embodiments, an offload task field 503 indicates if that core is performing an offload task. In some instances, if a core is performing an offload task for a different core that core should not take on additional tasks.

In some embodiments, an offload task operand field 505 indicates which core provided that core with an offload task. Note that this may be encoded in a bit vector or as a multibit value.

In some embodiments, a bound status field 507 indicates what bound state (such as compute, memory, or I/O) the core is in. Note that this may be encoded in a bit vector or as a multibit value.

In some embodiments, a given offload task to core(s) field 509 indicates which cores a particular core has given tasks to. In this example, core 1 has given tasks to cores 0 and 2.

In some embodiments, a location to save results field 511 indicates where a result of the task execution is to be stored or stored. This field may serve multiple purposes. If the requesting core provided this address, it gives the helper core exactly where to store the result. If the helper core provides this address, it allows the helper core to communicate that address to the requesting core and keep a record of that address should the requesting core not acknowledge completion of the task. Note that in some embodiments, results are just sent to the requesting core with the indication of completion of the task.

In some embodiments, an instruction pointer field 513 indicates the instruction pointer from where the offloaded task started. This allows the requesting core to easily incorporate the results of the offloaded task—it knows exactly what was replaced. In some embodiments, the requesting core tracks the instruction pointer.

In some embodiments, an initial processor state field 515 indicates wherein an initial state requesting core may be found. When used, this allows the helper core to load in the state of the requesting core to speed up execution.

Figure 6:
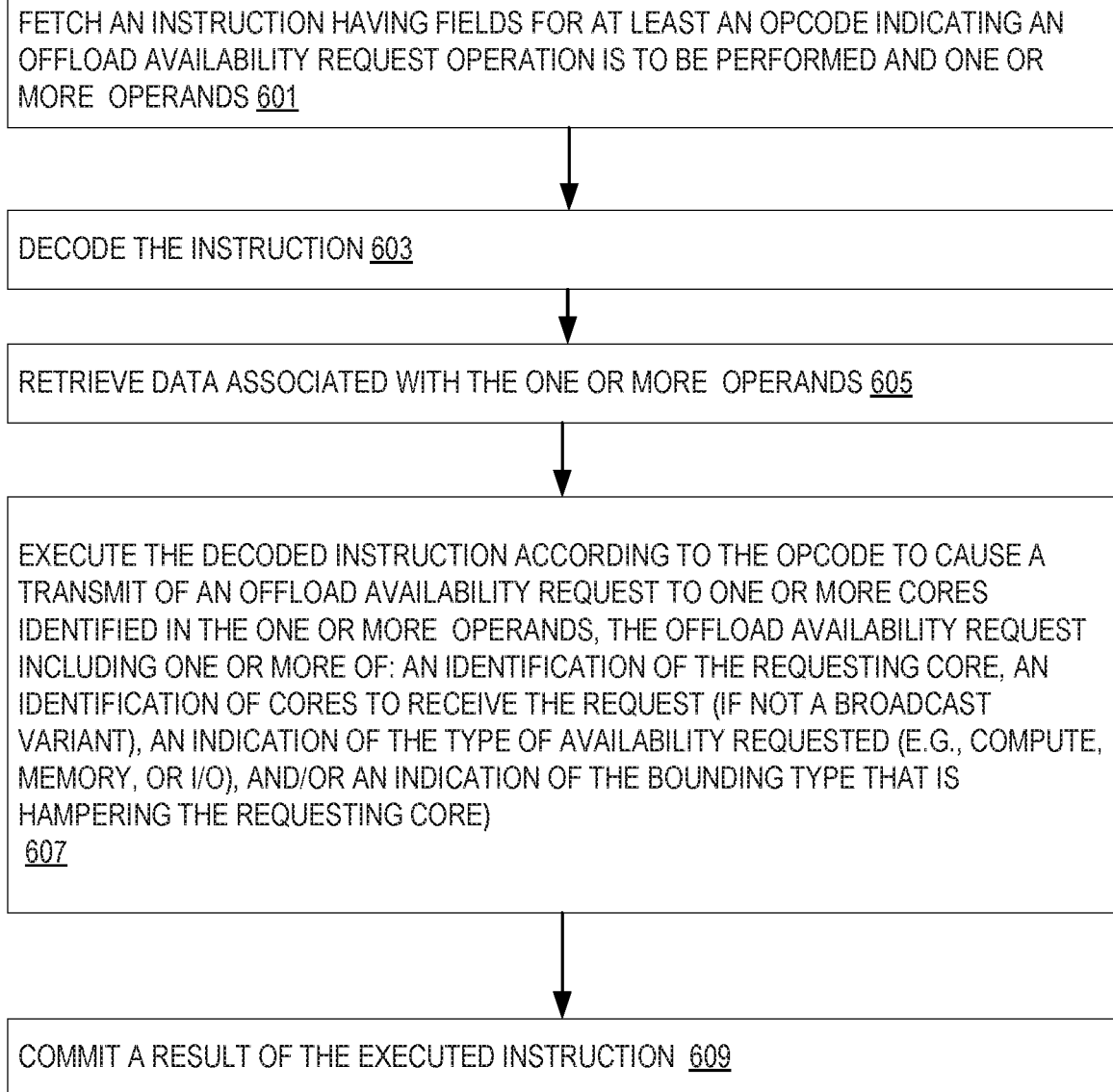
FIG. 6 illustrates embodiments of a method of processing an offload availability request instruction (OFFLOAD-REQ*).

FIG. 6 illustrates embodiments of a method of processing an offload availability request instruction (OFFLOADREQ*). Some or all of the operations of the method (or other processes described herein, or variations, and/or combinations thereof) are performed by a processor core in the processing of an instruction.

At 601 an instruction having fields for at least an opcode indicating an offload availability request operation is to be performed is fetched. The instruction may also include one or more operands and/or an immediate. Examples of instruction formats may be found in FIG. 4. An instruction is fetched using fetch circuitry such as shown in FIG. 31(B).

The fetched instruction is decoded at 603 using a decoder circuitry such as shown in FIG. 31(B).

In some embodiments, data associated with the one or more operands is retrieved at 605.

Execution circuitry executes the decoded instruction according to the opcode at 607. The execution of the decoded instruction includes causing a transmit of an offload availability request to one or more cores identified in the one or more operands (or broadcast if that is what the opcode indicates), the offload availability request including one or more of: an identification of the requesting core, an identification of cores to receive the request (if not a broadcast variant), an indication of the type of availability requested (e.g., compute, memory, or I/O), and/or an indication of the bounding type that is hampering the requesting core. The execution may also cause a reception of response from the one or more cores that the request was sent to and an update of the offload phase tracker 223 based on received responses. The handling of the response and updating of the offload phase tracker is done by the core-to-core offload circuitry or core-to-core offload finite state machine 221.

As noted above, the various aspects of the request such as a requester ID may be provided in one or more fields of the instruction including one or more operands (such as registers or memory) and/or an immediate.

A result of the executed instruction is committed at 609.

Note that when the offload availability request operation is not executed as an instruction that there is no fetch, decode, etc., but the actions of the execution circuitry are still performed.

FIG. 7 illustrates embodiments of a method of processing an offload availability request instruction (OFFLOAD-REQ*). Some or all of the operations of the method (or other processes described herein, or variations, and/or combinations thereof) are performed by a processor core in the processing of an instruction.

At 701 an instruction having fields for at least an opcode indicating an offload availability request operation is to be performed is fetched. The instruction may also include one or more operands and/or an immediate. Examples of instruction formats may be found in FIG. 4. An instruction is fetched using fetch circuitry such as shown in FIG. 31(B).

The fetched instruction is decoded at 703 using a decoder circuitry such as shown in FIG. 31(B).

In some embodiments, data associated with the one or more operands is retrieved at 705.

Execution circuitry executes the decoded instruction according to the opcode at 707. The execution of the decoded instruction includes causing core-to-core offload circuitry or core-to-core offload finite state machine to generate and transmit an offload availability request the offload availability request including one or more of: an identification of the requesting core, an identification of cores to receive the request as provided by a operand of the instruction (if not a broadcast variant), an indication of the type of availability requested (e.g., compute, memory, or i/o), and/or an indication of the bounding type that is hampering the requesting core). This information may come from operands and/or the offload phase tracker 223. The execution may also cause a reception of response from the one or more cores that the request was sent to and an update of the offload phase tracker 223 based on received responses. The handling of the response and updating of the offload phase tracker is done by the core-to-core offload circuitry or core-to-core offload finite state machine 221.

A result of the executed instruction is committed at 709.

Note that when the offload availability request operation is not executed as an instruction that there is no fetch, decode, etc., but the actions of the execution circuitry are still performed.

Figure 8:
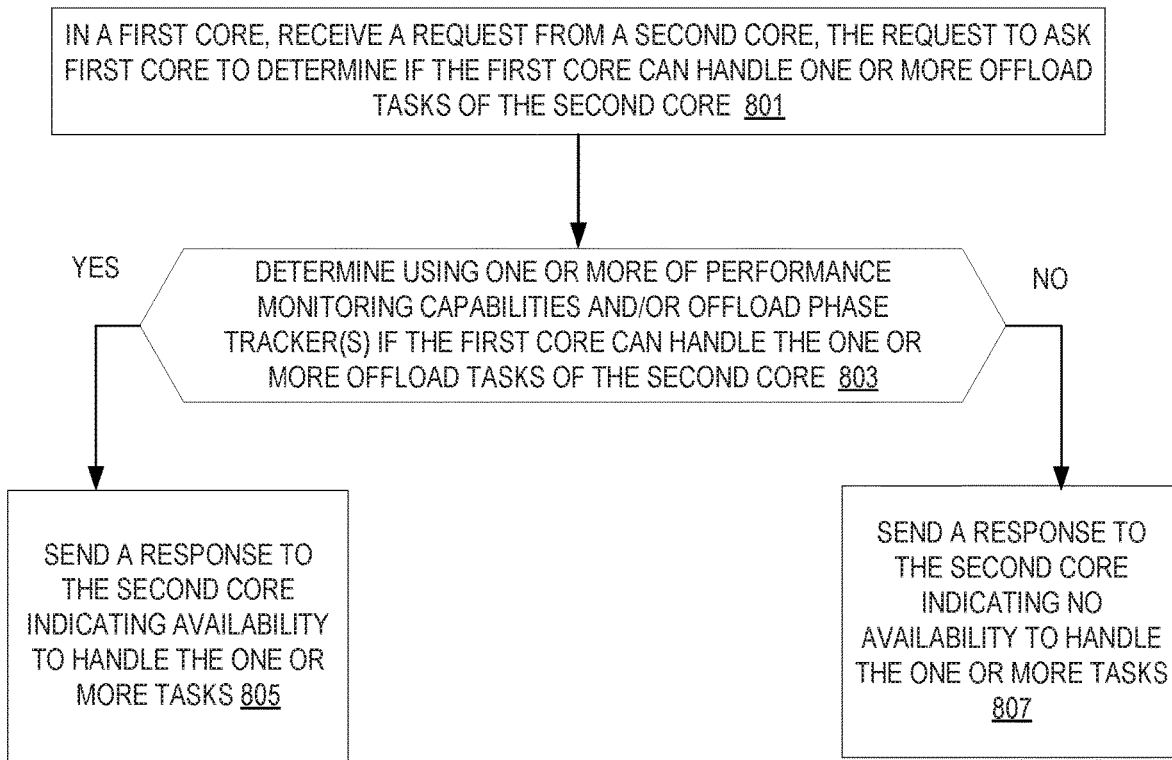
FIG. 8 illustrates embodiments of a method of handling an offload availability request at a receiving core.

FIG. 8 illustrates embodiments of a method of handling an offload availability request at a receiving core. In most embodiments, the core-to-core offload circuitry or core-to-core offload finite state machine 221 of a core performs this handling.

At 801 an offload availability request is received from a core. The offload availability request to ask the receiving core to determine if the receiving core can handle one or more offload tasks of the sending core. For example, using FIG. 2, core 1 203 receives this request from core 0 205.

The receiving core determines, using one or more of performance monitoring circuitry 211 and/or offload phase tracker(s) 223 if the receiving core can handle the one or more offload tasks of the second core at 803. For example, the offload availability request indicated that the requesting core was compute bound, the receiving core uses information about its performance to decide if it is able to handle the task or if it too is compute bound.

When the receiving core determines that it can handle the task, at 805 the receiving core sends a response to the requesting core indicating its availability to handle the one or more tasks.

When the receiving core determines that it cannot handle the task, at 807 the receiving core sends a response to the requesting core indicating its unavailability to handle the one or more tasks.

In some instances, it may be beneficial to send availability advertisements from a core to other cores that may want to offload a task or receive an offload task instead, or in addition to, performing an offload availability request. For example, if the interconnect 231 is not busy, it may be worth updating other cores about a particular core's availability status.

Figure 9:
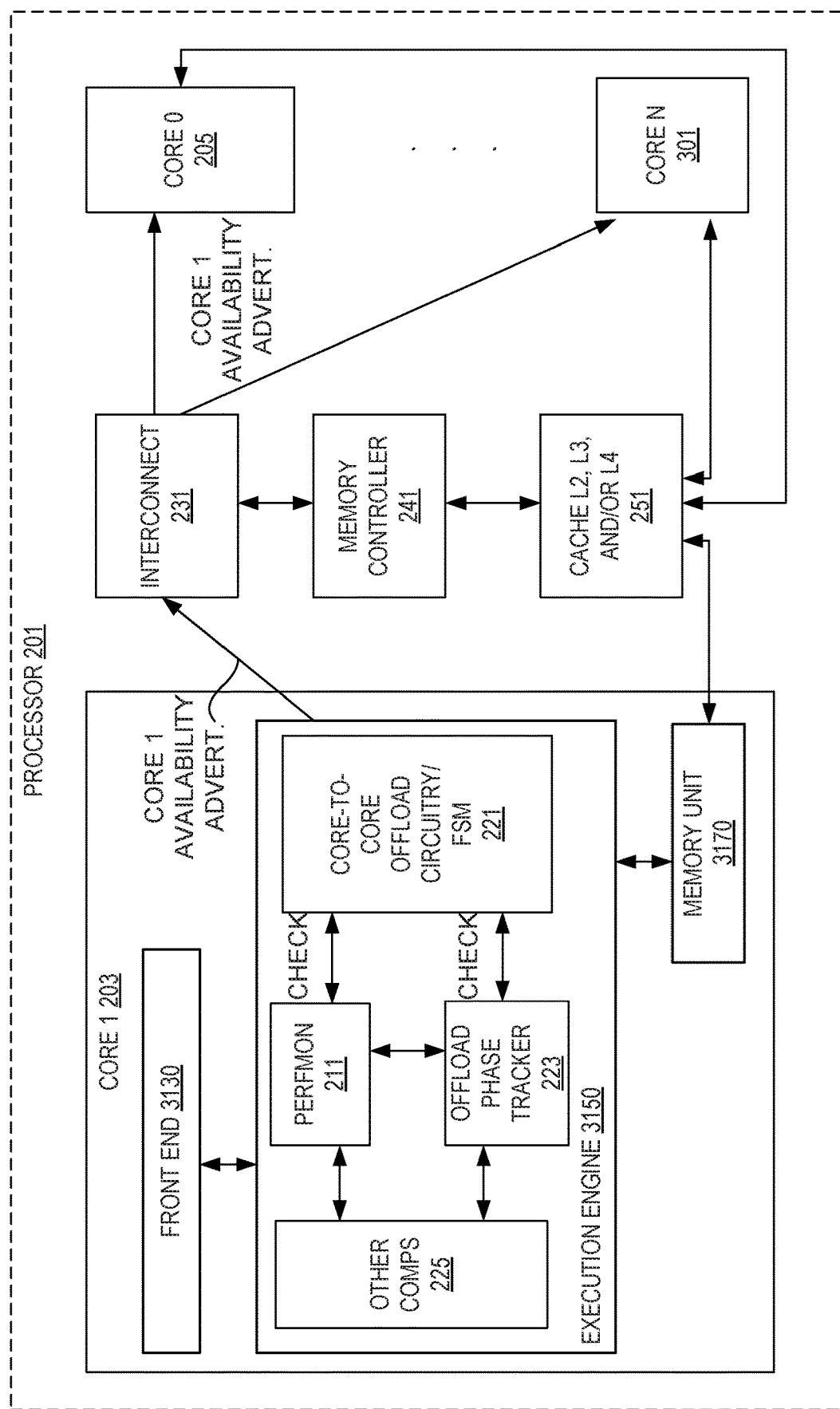
FIG. 9 illustrates embodiments of at least three cores and common components shared by these cores where one of the three cores is updating the other core with its offload availability.

FIG. 9 illustrates embodiments of at least three cores and common components shared by these cores where one of the three cores is updating the other core with its offload availability. As a core is running, its performance monitoring circuitry 211 will monitor performance of the core. How a core is performing at a given point in time impacts whether it can act as a helper core. For example, if the core is continually retiring instructions, then it is likely compute bound and not able to help on a compute intensive task. Similarly, if the core is already experiencing a lot of cache misses (and therefore has a lot of memory accesses), adding a memory intensive task is also probably not a good idea. The core-to-core offload circuitry or core-to-core offload finite state machine 221 looks at the performance monitoring circuitry 211 data to make that determination.

The core-to-core offload circuitry or core-to-core offload finite state machine 221 can also check the offload phase tracker 223 which may indicate that the core is already a helper core. Depending upon the implementation, the accepting and beginning of an offload task by one core may not be known to other cores. As such, advertising this fact may be beneficial in that it alerts other cores that this core may not be the ideal choice to ask to be a helper core.

In this illustration, core 1 203 is sending its availability as an advertisement to core 0 205, core N 301, etc. This offload availability advertisement may be performed on a schedule, when the interconnect 231 is free, when there is a change in status of core 1 203, and/or on a scheduled basis.

FIG. 10 illustrates examples of an offload availability advertisement according to some embodiments. The offload availability advertisement includes fields for one or more of a sending core ID 1001, an indication of if the sending core has an offload task already 1003, and a bounding status 1007. For example, the first exemplary offload availability advertisement is from core 0, which has an offload task already, and is compute bound. Note that offload availability advertisements may also be made for a core that while it has an offload task is not memory, I/O, or compute bound (and therefore may make a decent candidate for offload). In some embodiments, an offload availability advertisement also includes a destination ID 1009 field if the offload availability advertisement is to only be sent to a proper subset of cores. Additionally, in some embodiments, the offload availability advertisement includes a timestamp 1011 of when it was sent. This allows a receiving core to throw out "old" offload availability advertisements that are not the latest ones. Note that in some embodiments, the offload availability advertisement is simply what the core has in its offload phase tracker 223 for itself plus a timestamp.

Figure 11:
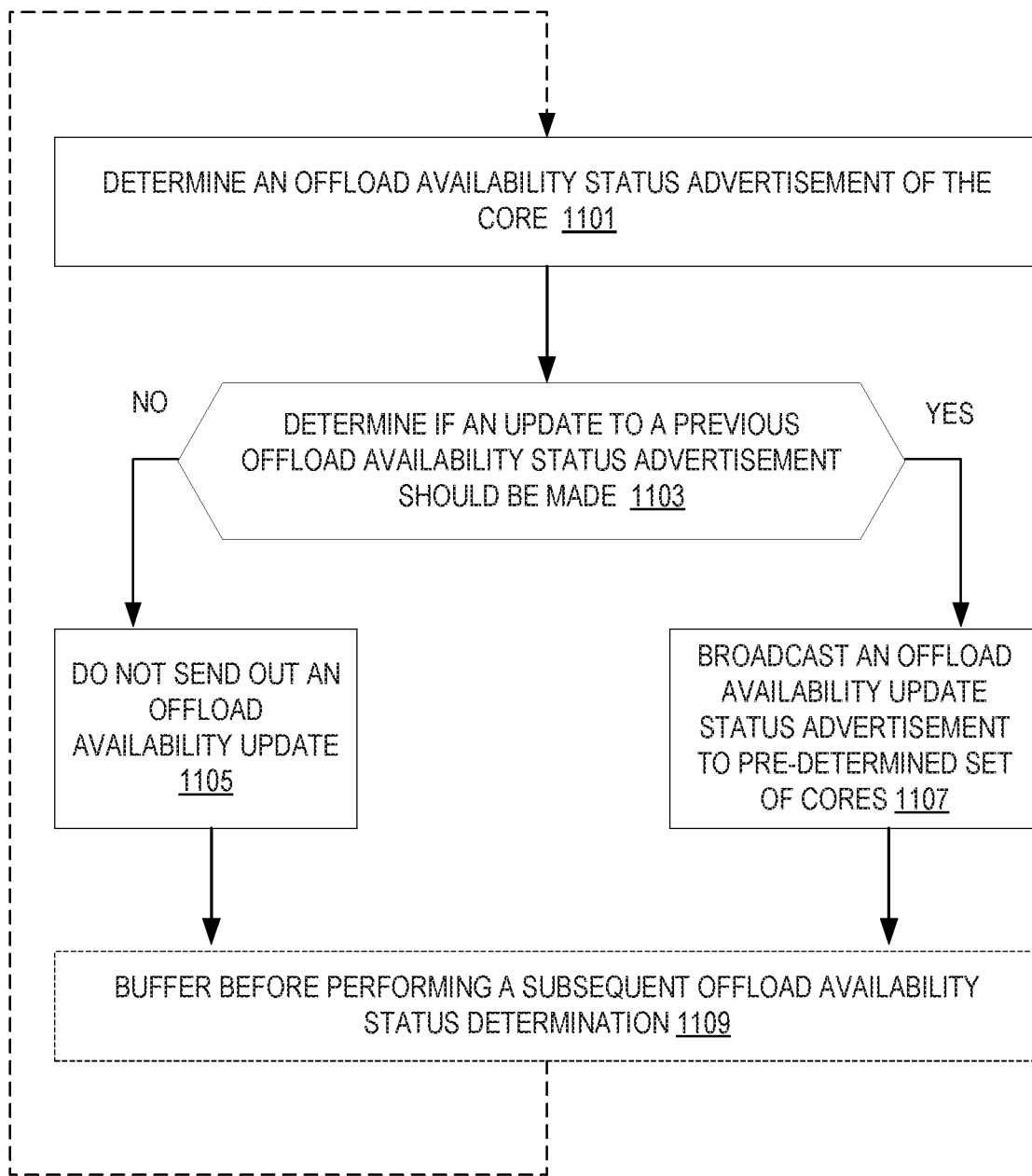
FIG. 11 illustrates embodiments of a method of generating a core advertisement.

FIG. 11 illustrates embodiments of a method of generating a core advertisement. In most embodiments, the core-to-core offload circuitry or core-to-core offload finite state machine 221 of the core performs this handling.

At 1101 a determination of an offload availability status of the core is made. As noted above, this determination may be based on the performance monitoring circuitry 211 data and/or the offload phase tracker 223 information.

In some embodiments, a determination of whether an update to a previous offload availability status should be made as an offload availability status advertisement is done at 1103. For example, if there has been no change in the offload availability status, then an update may not be needed. If the interconnect coupled to the core is clogged, this may also indicate that no update, at least at this time, should be made.

When it is determined that no offload availability status advertisement should be sent, then one is not sent at 1105. Essentially, this is a no-op in the flow.

When it is determined that an offload availability status advertisement should be sent, the offload availability advertisement is broadcast to pre-determined set of cores at 1107. This predetermined set may be all of the cores, or a proper subset of them. For example, if the core is already working on a task for a core, it probably does not need to update that core with its availability. In other embodiments, when the determination of 1103 is not performed, the offload availability update status report is broadcast. This typically occurs in implementations where the offload availability update status is periodically sent on a schedule. This schedule may be set by a user (such as in a model specific register), pre-determined in the core-to-core offload circuitry or core-to-core offload finite state machine 221, or automatically set based on historical usage of the interconnect 241.

In some embodiments, before performing a subsequent offload availability status determination at 1101, a buffer or delay is implemented at 1109.

Figure 12:
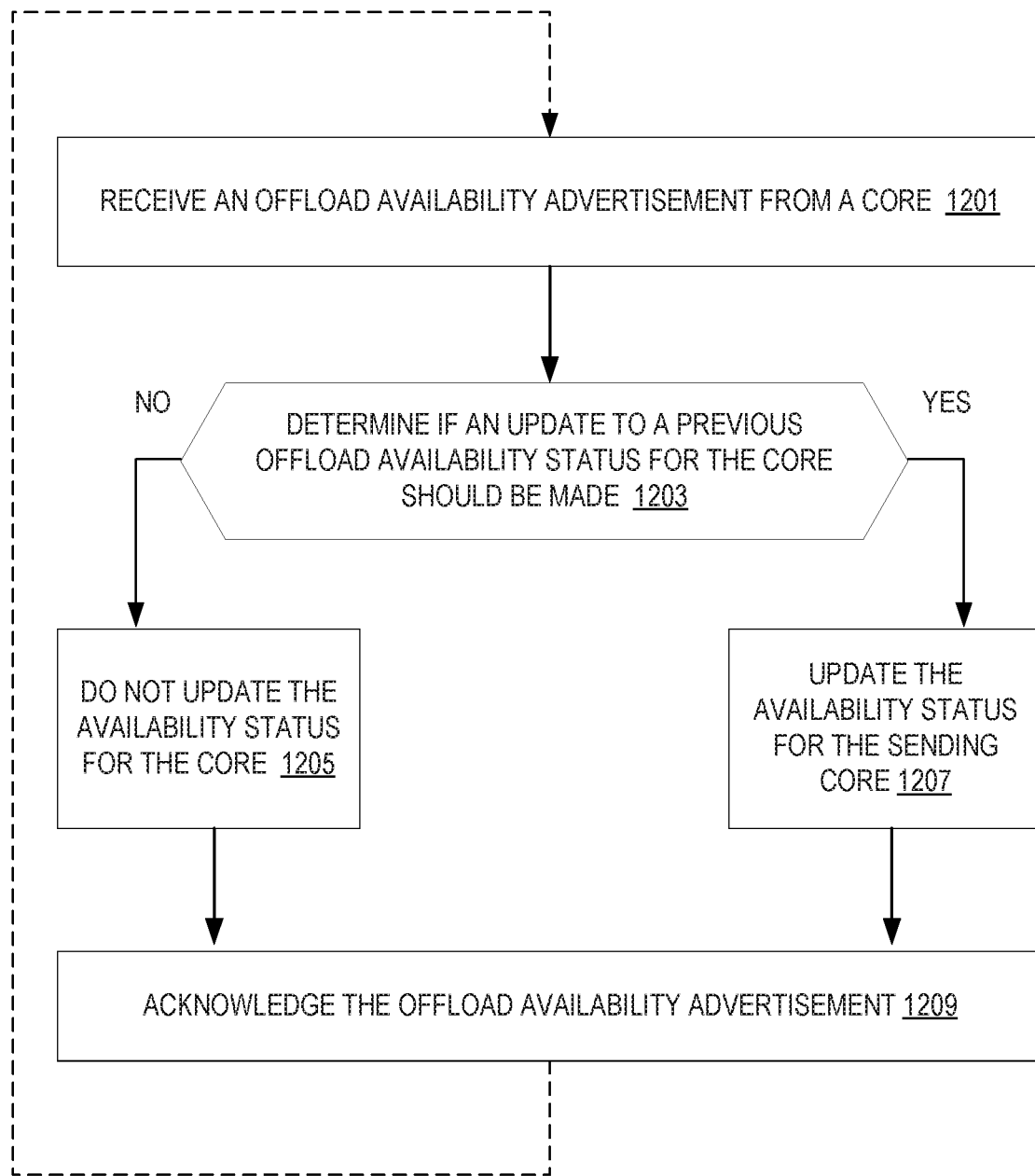
FIG. 12 illustrates embodiments of a method of handling receiving of offload availability advertisement in a core.

FIG. 12 illustrates embodiments of a method of handling receiving of offload availability advertisement in a core. In most embodiments, the core-to-core offload circuitry or core-to-core offload finite state machine 221 of the core performs this handling.

At 1201 an offload availability advertisement is received from another core.

In some embodiments, a determination of whether an update to a previous offload availability status should be made is done at 1203. For example, if there has been no change in the offload availability status from the core that sent the offload availability status, then an update is not be needed. In other words, if the entry for the core that sent the advertisement is the same as the entry in the offload phase tracker 223, then no update needs to be made.

When it is determined that no update is needed, then the corresponding entry of the offload phase tracker 223 is left unchanged at 1205. Essentially, this is a no-op in the flow.

In some instances, an update is not made if the received offload availability advertisement is older than the last one that was received for the sending core.

When it is determined that an update should be made, the status of the sending core is updated in the offload phase tracker 223 at 1207.

In some embodiments, an acknowledgment of receipt of the offload availability advertisement to the sending core is made and caused to be sent at 1209.

Figure 13:
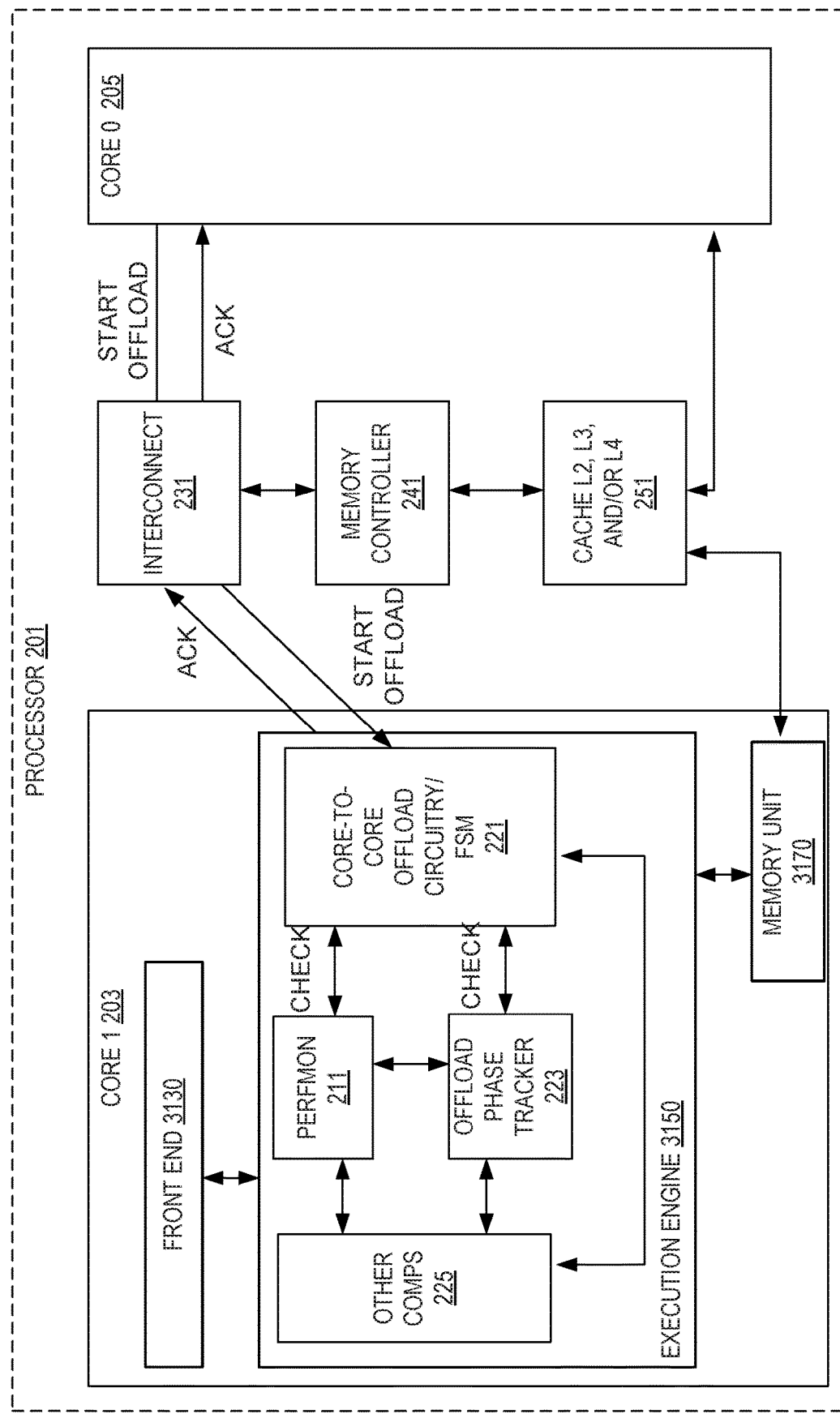
FIG. 13 illustrates embodiments of at least two cores and common components shared by these cores where one of the two cores is sending an offload start request to the other core.

FIG. 13 illustrates embodiments of at least two cores and common components shared by these cores where one of the two cores is sending an offload start request to the other core. Note that the components have the same numbering and functionality as detailed with respect to FIG. 2, etc.

In this illustration, core 0 205 has an offload task for core 1 203 and believes that core 1 203 is available to act as a helper core and take the offloaded task. Note what is not shown in this figure is an interposing operating system to handle the offload start.

As shown, core 0 205 sends an offload start request through an interconnect 231 (such as a ring interconnect, point-to-point, fabric, etc.) to core 1 203. Core 1 203 ingests the offload start request and determines if it can help (what is its availability to be a helper core). Core 1 203 further sends an acknowledgement back to core 0 205. Upon receipt of the offload start request, core 1 203 will retrieve the task from wherever it is stored (typically this information is included in the offload start request), update any offload phase tracker 223 entry it has about itself, and perform the task. Typically, the offload start request is generated by the execution of an instruction by core 0 205.

Figure 14:
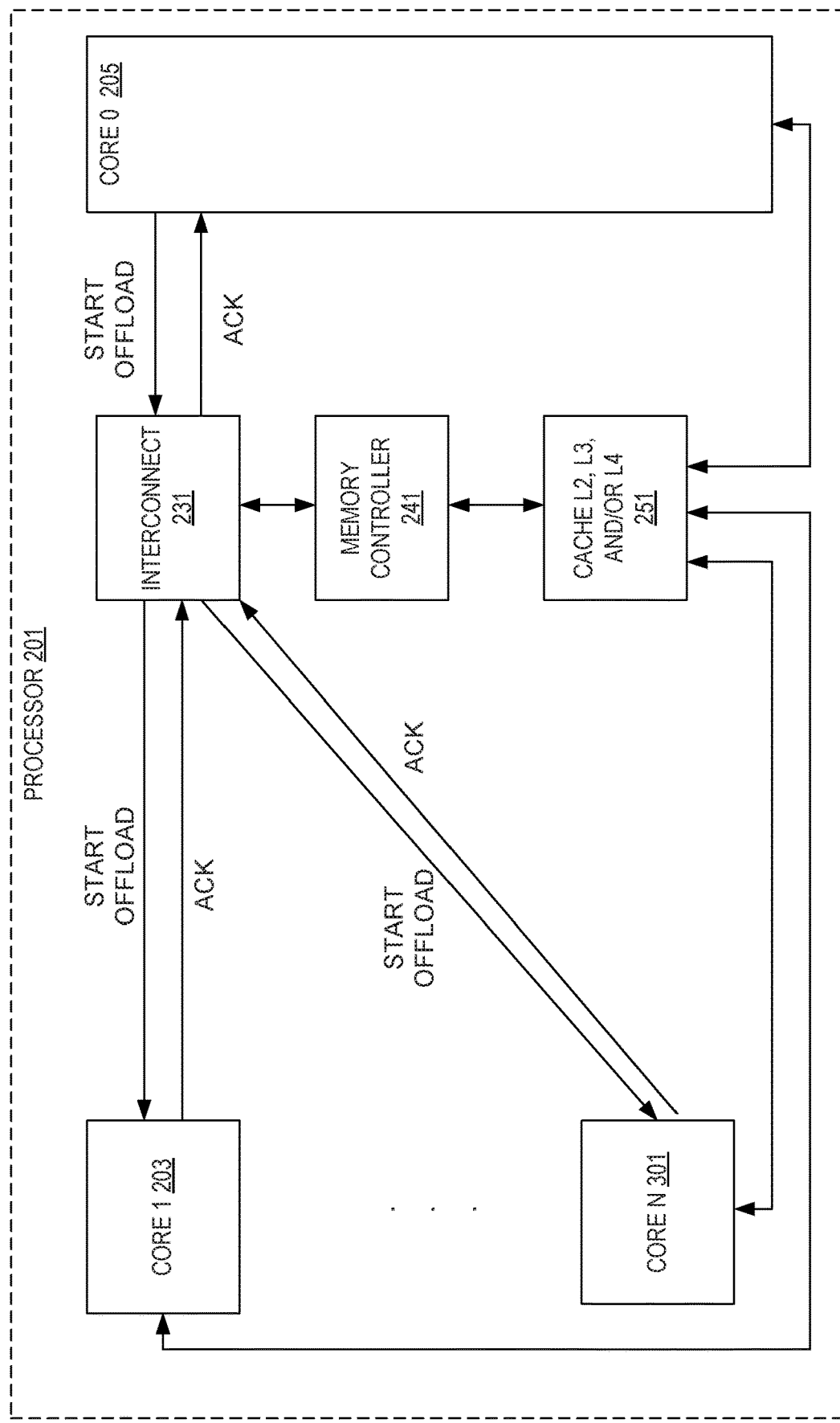
FIG. 14 illustrates embodiments of at least three cores and common components shared by these cores where one of the three cores is sending an offload start request.

FIG. 14 illustrates embodiments of at least three cores and common components shared by these cores where one of the three cores is sending an offload start request. This example is similar to FIG. 13, but the offload start request is a broadcast to a plurality of cores. In this example, that includes core 1 203 as in FIG. 2 and additionally core N 301. While a broadcast may occupy more bandwidth of the interconnect, it may allow for more cores to respond to core 0 205 to perform the task.

Figure 15:
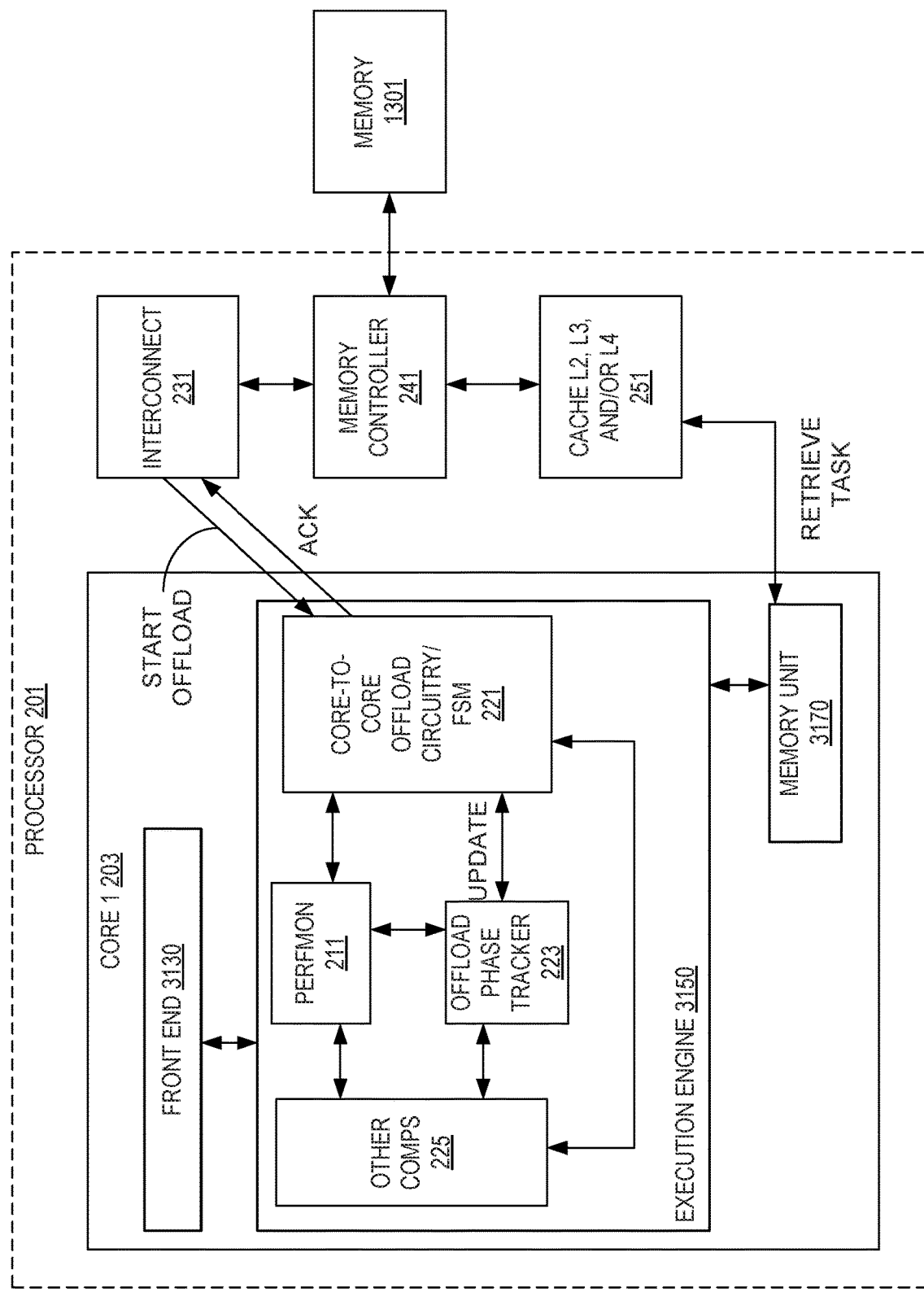
FIG. 15 illustrates embodiments including a core that receives an offload start request.

FIG. 15 illustrates embodiments including a core that receives an offload start request. In this example, core 1 203 receives the offload start request. Receiving this request may trigger many actions. A first action that may occur is the core-to-core offload circuitry or core-to-core offload finite state machine 221 determining the core can handle the offload. It is possible that since the last time the requesting core was informed about the status of core 1 203 that the availability of core 1 203 has changed. For example, an operating system may have scheduled a large, high priority task in the meantime. The core-to-core offload circuitry or core-to-core offload finite state machine 221 will look at one or more of: instructions schedule and queued for execution, the performance monitoring circuitry 211 data, and the current status as defined by offload phase tracker 223. If core 1 203 cannot take on the task, it sends back an acknowledgment detailing this. When core 1 203 can take on the task, it sends back an acknowledgment to alert core 0 205 that it is starting.

A second action that may occur is to request the task from memory or cache. In some embodiments, the core-to-core offload circuitry or core-to-core offload finite state machine 221 directs this request directly based on the addressing information provided by the offload start request. In other embodiments, the core-to-core offload circuitry or core-to-core offload finite state machine 221 generates one or more load instructions using an addressed based off information provided by the offload start request and gives it to the other components 225 to load the task. Typically, the task then starts running. Note that if the core cannot access the task, it will inform the requesting core.

A third potential action is to update the offload phase tracker 223 to include information from the offload start request and to indicate that an offload is in process.

In some embodiments, a fourth action is to load a core state made available by the requesting core (either as a part of the request or as a location). The core state may include pre-filled registers, etc.

FIG. 16 illustrates embodiments of various offload start instruction variants. Note that not all instruction configurations are shown. However, each instruction has an opcode 1601 to indicate if the offload start is to be individually addressed (e.g., STARTOFFLOAD) or broadcast (e.g., STARTOFFLOABRDCAST).

Each instruction also has fields to identify one or more operands such as operand 1 1603, operand 2 1605, operand 3 1607, operand 4 1609, operand 5 1611 and/or field for an immediate (not shown, but could replace one or more of the operands such as operand 3). The use of those operands and immediate may change. Note that operand 1 1603, operand 2 1605, operand 3 1607, operand 4 1609, operand 5 1611 may be registers or memory locations.

In some embodiments, a STARTOFFLOAD* instruction will include an address of the task to perform which, in this example, is found in operand 1 1603. This address may be in main memory, cache, or disk. This address would be provided to the helper core. In some embodiments, this address to fetch is a location of a task to be included in the offload start request.

In some embodiments, a STARTOFFLOAD* instruction will also include an instruction pointer (shown here as being provided by operand 2 1605). The instruction pointer alerts the receiving core as to where the task came from in the original code and would be sent as a part of the offload start request. The instruction pointer may be maintained by the requesting core instead or, or in addition to, sending to the helper core.

In some embodiments, a STARTOFFLOAD* instruction will include a requesting core ID (shown here as being provided by operand 3 1607). This allows the recipient and others know who sent the request.

In some embodiments, a STARTOFFLOAD* instruction will include a helper core ID (shown here as being provided by operand 4 1609). This dictates who the recipient core (the future helper core) will be.

In some embodiments, a STARTOFFLOAD* instruction will include a requesting core state location (shown here as being provided by operand 5 1611). This allows the recipient core to load the requesting core's state.

Note the information of the operands is may be used to generate an offload start request to be sent from a core to a potential helper core.

In some embodiments, the execution of a STARTOFFLOAD* invokes the core-to-core offload circuitry or core-to-core offload finite state machine 221 to generate the start offload request. When the instruction does not utilize operand registers, the core-to-core offload circuitry or core-to-core offload finite state machine 221 uses the offload phase tracker 223 to generate the start offload request.

FIG. 17 illustrates examples of an offload start request according to some embodiments. The offload start request includes one or more fields. These fields may include content for one or more of a sending core ID 1701, a task or address of a task 1703, a destination ID 1705, an instruction pointer in the original code 1707, a core state or address of a core state 1709, and/or a timestamp 1711. Note the content of the offload start request typically comes from the instruction.

FIG. 18 illustrates embodiments of a method of processing a startoffload* instruction. Some or all of the operations of the method (or other processes described herein, or variations, and/or combinations thereof) are performed by a processor core in the processing of an instruction.

At 1801 an instruction having fields for an opcode indicating an offload start operation is to be performed and one or more operands providing information for that operation. Examples of instruction formats may be found in FIG. 16. An instruction is fetched using fetch circuitry such as shown in FIG. 31(B).

The fetched instruction is decoded at 1803 using a decoder circuitry such as shown in FIG. 31(B).

In some embodiments, data associated with the one or more operands is retrieved at 1805.

Execution circuitry executes the decoded instruction according to the opcode at 1807. The execution of the decoded instruction includes causing a generation and transmission of an offload start request to one or more core(s) indicated by the one or more operands or as a broadcast, the offload start request including one or more of: an identifier of the core that is requesting the offload, a location of where the helper core can find the task to perform, the task itself, an identifier of the core(s) to perform the offload as a helper(s), an instruction pointer from the code, a processor state, a processor state location, and/or a timestamp. Note the content of the offload start request may be gathered from the operands of the instruction.

For example, in some embodiments, an offload start request comprising an identifier of the core that is requesting the offload, a location of where the helper core can find the task to perform, an identifier of the core(s) to perform the offload as a helper(s), an instruction pointer from the code, a processor state location, and a timestamp is sent. In other embodiments, an offload start request comprising an identifier of the core that is requesting the offload, a location of where the helper core can find the task to perform, an identifier of the core(s) to perform the offload as a helper(s), and a timestamp is sent. In other embodiments, an offload start request comprising an identifier of the core that is requesting the offload, an identifier of the core(s) to perform the offload as a helper(s), and a timestamp is sent. In these embodiments, the helper core is already aware of the location of a task (as in that location is pre-defined). These are merely exemplary types of offload start requests that can be sent using the combination of items detailed above.

The execution may also cause a response from the one or more cores identified in the one or more operands and an update of the offload phase tracker 223 based on received responses. The handling of the response and updating of the offload phase tracker is done by the core-to-core offload circuitry or core-to-core offload finite state machine 221.

Note that in some embodiments, the core-to-core offload circuitry or core-to-core offload finite state machine 221 determines: which core to offload to, the IP, the task address, etc., and populates that operand information in one or more operands prior to those one or more operands being retrieved.

In some embodiments, the core state is saved and prior to this instruction and the core-to-core offload circuitry or core-to-core offload finite state machine 221 populates that operand prior to the that operand being retrieved.

A result of the executed instruction is committed at 1809.

Note that when the offload start operation is not executed as an instruction that there is no fetch, decode, etc., but the actions of the execution circuitry are still performed.

Figure 19:
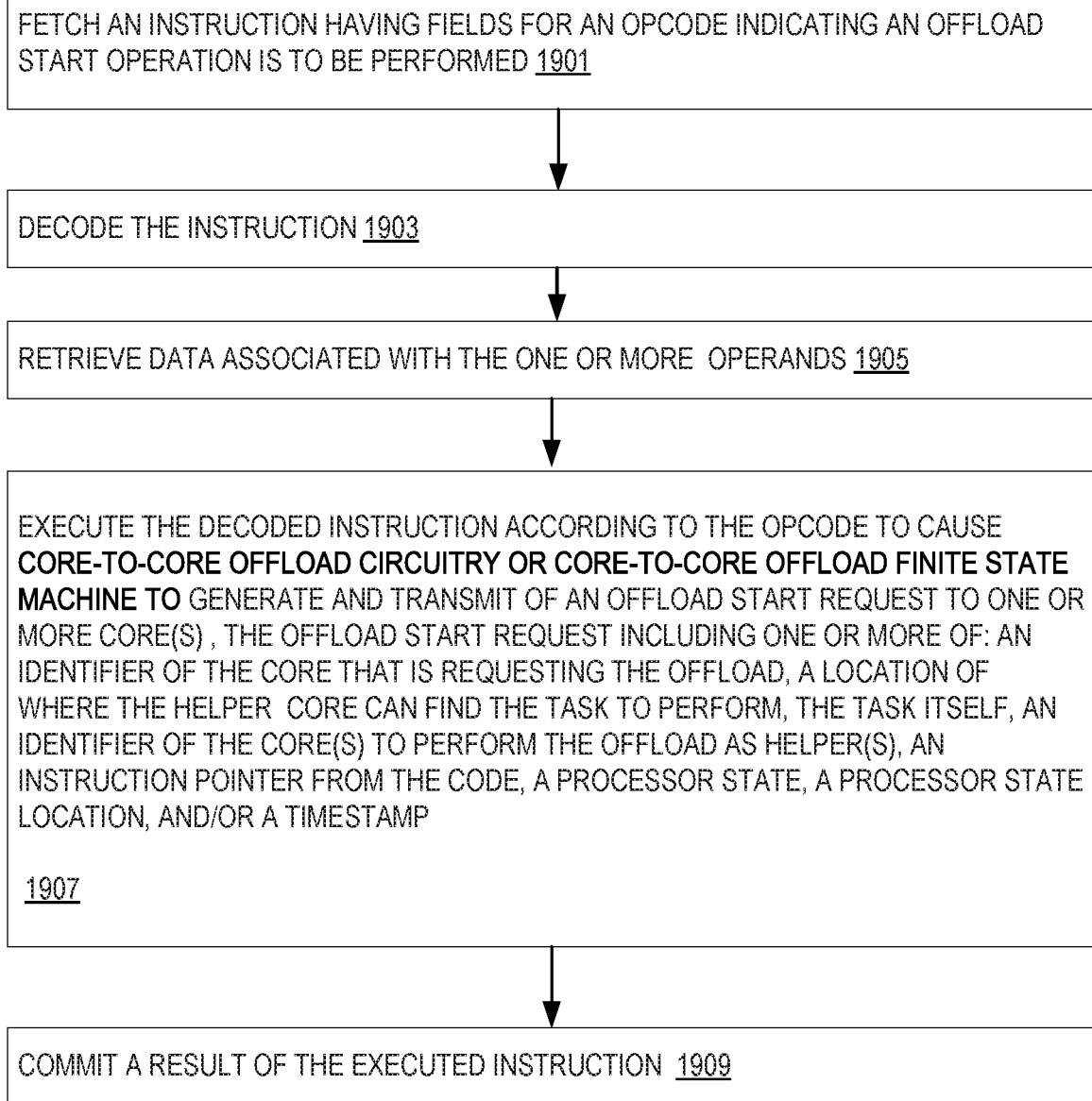
FIG. 19 illustrates embodiments of a method of processing a startoffload* instruction.

FIG. 19 illustrates embodiments of a method of processing a startoffload* instruction. Some or all of the operations of the method (or other processes described herein, or variations, and/or combinations thereof) are performed by a processor core in the processing of an instruction.

At 1901 an instruction having fields for an opcode indicating an offload start operation is to be performed. In some embodiments, one or more operands providing information for that operation are utilized. Examples of instruction formats may be found in FIG. 16. An instruction is fetched using fetch circuitry such as shown in FIG. 31(B).

The fetched instruction is decoded at 1903 using a decoder circuitry such as shown in FIG. 31(B).

In some embodiments, data associated with the one or more operands is retrieved at 1905.

Execution circuitry executes the decoded instruction according to the opcode at 1907. The execution of the decoded instruction includes causing core-to-core offload circuitry or core-to-core offload finite state machine to generate and transmit of an offload start request to one or more core(s), the offload start request including one or more of: an identifier of the core that is requesting the offload, a location of where the helper core can find the task to perform, the task itself, an identifier of the core(s) to perform the offload as helper(s), an instruction pointer from the code, a processor state, a processor state location, and/or a timestamp. This information may come from operands and/or the offload phase tracker 223.

For example, in some embodiments, an offload start request comprising an identifier of the core that is requesting the offload, a location of where the helper core can find the task to perform, an identifier of the core(s) to perform the offload as a helper(s), an instruction pointer from the code, a processor state location, and a timestamp is sent. In other embodiments, an offload start request comprising an identifier of the core that is requesting the offload, a location of where the helper core can find the task to perform, an identifier of the core(s) to perform the offload as a helper(s), and a timestamp is sent. In other embodiments, an offload start request comprising an identifier of the core that is requesting the offload, an identifier of the core(s) to perform the offload as a helper(s), and a timestamp is sent. In these embodiments, the helper core is already aware of the location of a task (as in that location is pre-defined). These are merely exemplary types of offload start requests that can be sent using the combination of items detailed above.

The execution may also cause a response from the one or more cores identified in the one or more operands and an update of the offload phase tracker 223 based on received responses. The handling of the response and updating of the offload phase tracker is done by the core-to-core offload circuitry or core-to-core offload finite state machine 221.

Note that in some embodiments, the core-to-core offload circuitry or core-to-core offload finite state machine 221 determines: which core to offload to, the IP, the task address, etc., and populates that operand information in one or more operands prior to those one or more operands being retrieved.

In some embodiments, the core state is saved and prior to this instruction and the core-to-core offload circuitry or core-to-core offload finite state machine 221 populates that operand prior to the that operand being retrieved.

A result of the executed instruction is committed at 1909.

Note that when the offload start operation is not executed as an instruction that there is no fetch, decode, etc., but the actions of the execution circuitry are still performed.

Figure 20:
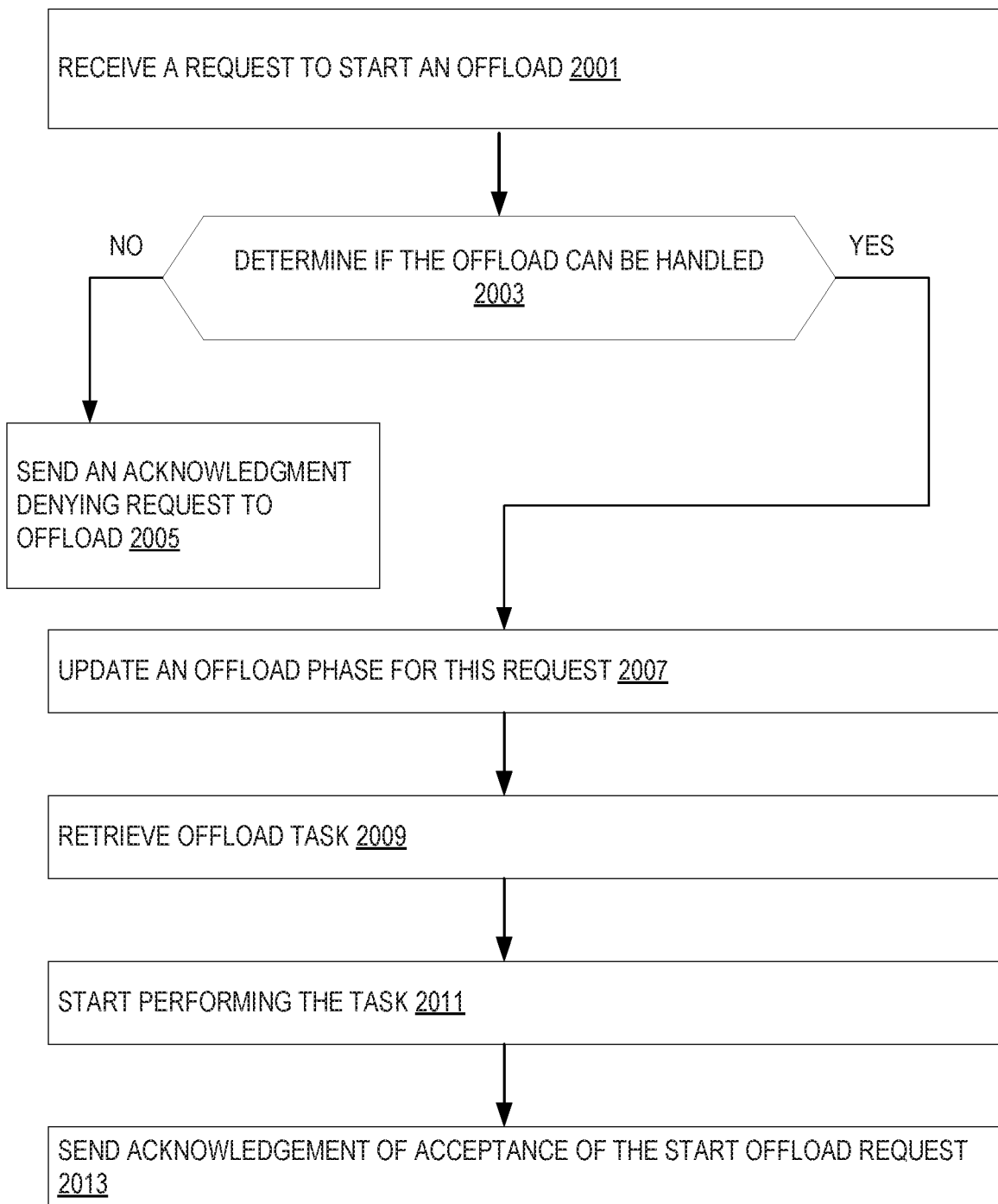
FIG. 20 illustrates embodiments of a method of handling a received offload start request.

FIG. 20 illustrates embodiments of a method of handling a received offload start request. Some or all of the operations of the method (or other processes described herein, or variations, and/or combinations thereof) are performed by the core-to-core offload circuitry or core-to-core offload finite state machine 221.

At 2001 a request to start an offload is received. Details on the content of such a request have been detailed earlier.

A determination of if the offload can be handled is made at 2003. For example, the core-to-core offload circuitry or core-to-core offload finite state machine 221 determines based on the offload phase tracker 223 and/or performance monitoring circuitry 211 if its core can handle the request.

When the request cannot be handled, an acknowledgment denying the offload start request is caused to be sent at 2005.

When the request can be handled, an update an offload phase tracker 223 is made using the details of the offload start request at 2007.

The offload task is retrieved at 2009 as detailed above.

The receiving core starts performing the retrieved task at 2011.

An acknowledgment denying the offload start request is caused to be sent at 2013.

Figure 21:
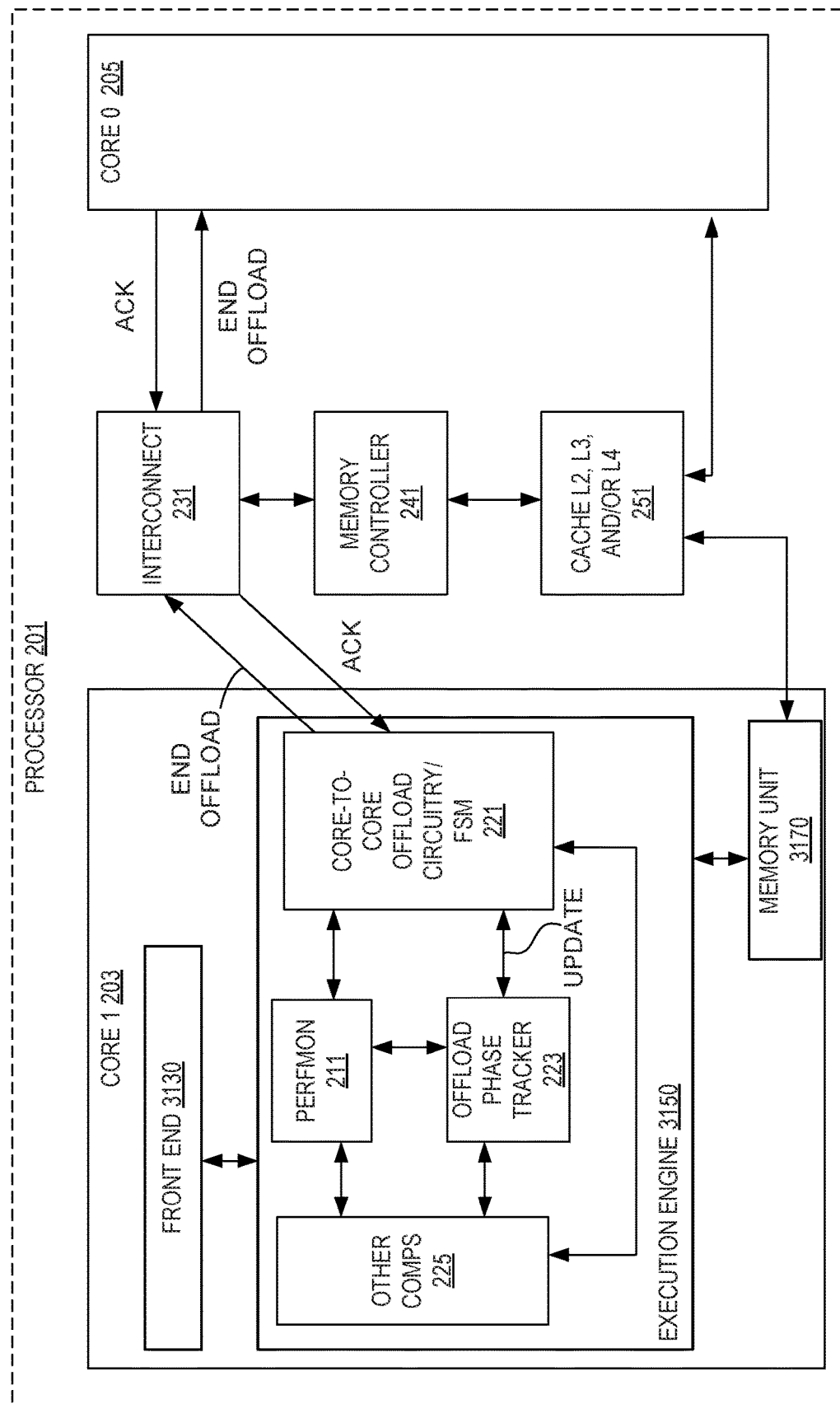
FIG. 21 illustrates embodiments of at least two cores and common components shared by these cores where one of the two cores is sending an offload end indication to the other core.

FIG. 21 illustrates embodiments of at least two cores and common components shared by these cores where one of the two cores is sending an offload end indication to the other core. Note that the components have the same numbering and functionality as detailed with respect to FIG. 2, etc.

In this illustration, core 0 205 had an offload task for core 1 203 and core 1 203 is ending that task (either because the task is complete or because core 1 203 needs to do something else). Note what is not shown in this figure is an interposing operating system to handle the offload end.

As shown, core 1 205 sends an offload end indication through an interconnect 231 (such as a ring interconnect, point-to-point, fabric, etc.) to core 0 205. Core 0 205 ingests the offload end indication, and may update its offload phase tracker, determine if the task was complete, retrieve and integrate results, etc. In some embodiments, core 0 205 sends an acknowledgement back to core 1 203. Typically, this offload end indication is generated by the execution of an instruction from the other components 225. Core 1 205 also updates its offload phase tracker 223.

Figure 22:
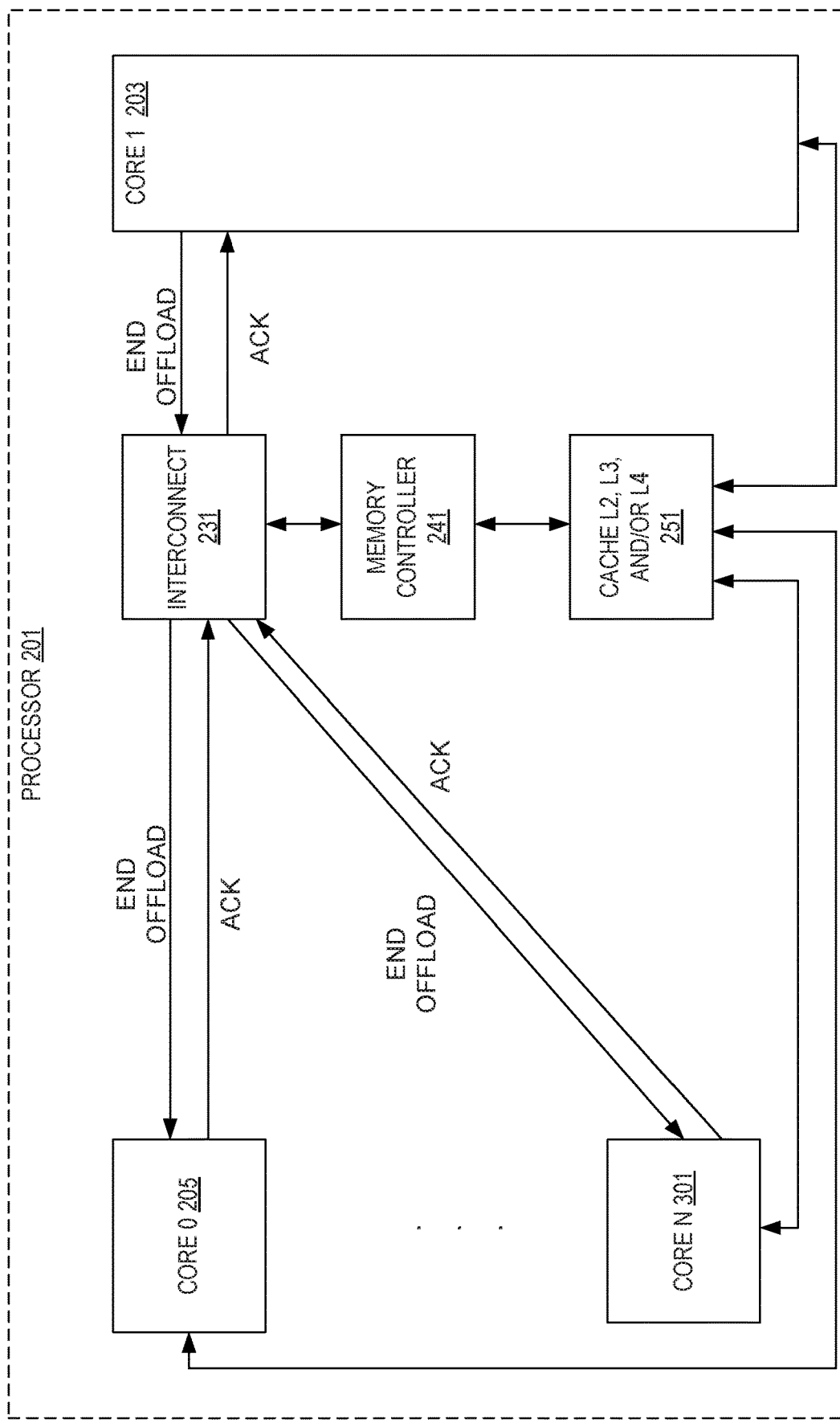
FIG. 22 illustrates embodiments of at least three cores and common components shared by these cores where one of the three cores is sending an offload end indication to the other cores.

FIG. 22 illustrates embodiments of at least three cores and common components shared by these cores where one of the three cores is sending an offload end indication to the other cores. This example is similar to FIG. 21, but the offload end indication is a broadcast to a plurality of cores. In this example, that includes core 0 205 as in FIG. 2 and additionally core N 301. While a broadcast may occupy more bandwidth of the interconnect, it may allow for more cores to know that core 1 203 may be free to perform a task.

Figure 23:
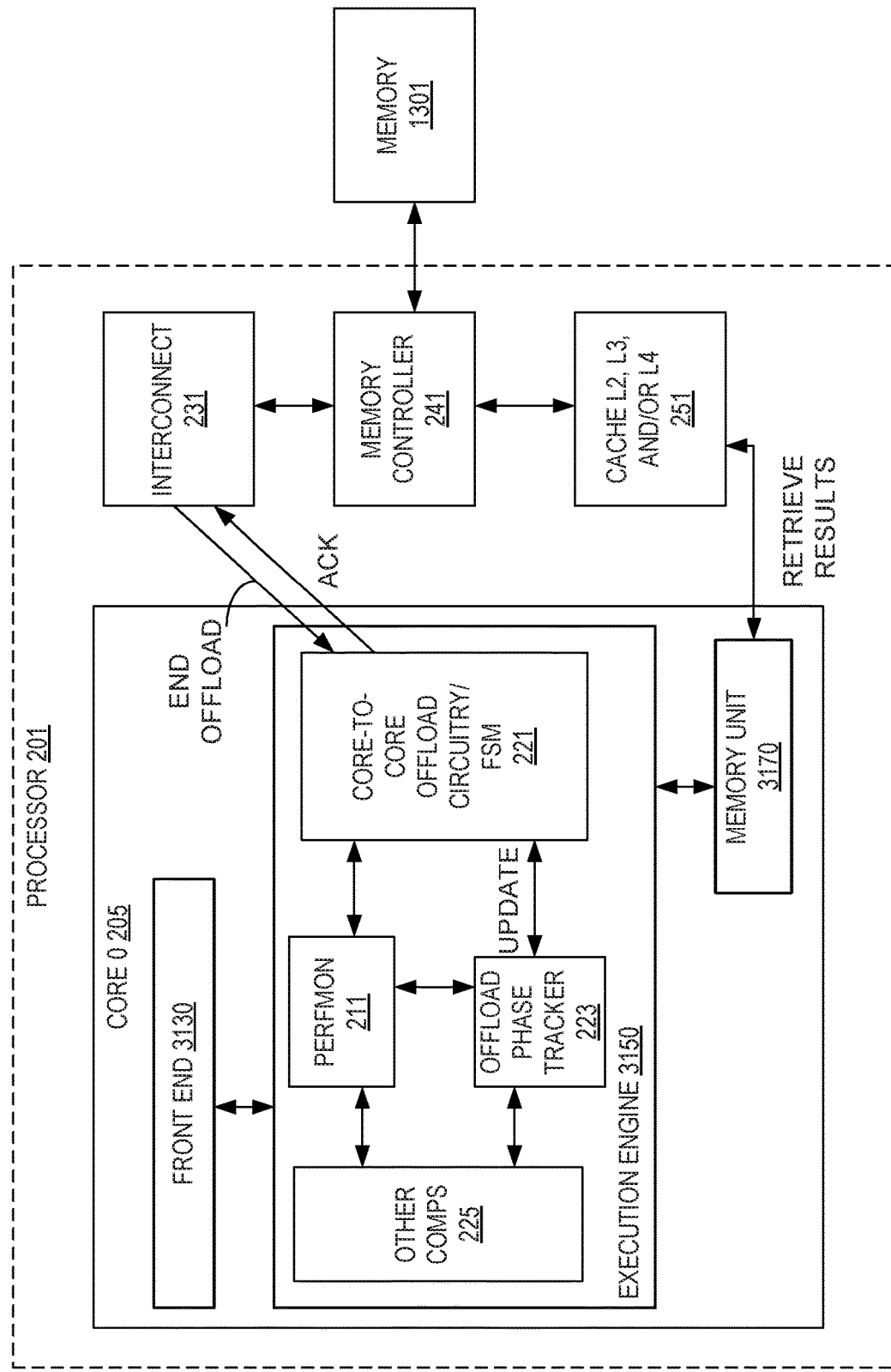
FIG. 23 illustrates embodiments of a core that receives an offload end indication.

FIG. 23 illustrates embodiments of a core that receives an offload end indication. In this example, core 0 205 receives the offload end indication. Receiving this offload end indication may trigger many actions.

A potential first action is to retrieve results of the offloaded the task from memory or cache as indicated by the offload end indication. In some embodiments, the core-tocore offload circuitry or core-to-core offload finite state machine 221 directs this request directly based on the addressing information provided by the offload end indication. In other embodiments, the core-to-core offload circuitry or core-to-core offload finite state machine 221 generates one or more load instructions using an addressed based off information provided by the offload end indication and gives it to the other components 225 to load the task. Typically, the result is ingested as if it had been locally executed in the code. This location may come from an instruction pointer of the offload end indication or be stored locally in the requesting core.

A potential second action is to update the offload phase tracker 223 to include information from the offload end indication and to indicate that an offload complete.

In some embodiments, a third action is to load a core state made available by the helper core (either as a part of the request or as a location). The core state may include filled registers, etc.

FIG. 24 illustrates embodiments of various offload end instruction variants. Note that not all instruction configurations are shown. However, each instruction has an opcode 2401 to indicate if the offload end indication generated by an offload end operation is to be individually addressed (e.g., ENDOFFLOAD) or broadcast (e.g., ENDOFFLOABRD-CAST).

Each instruction also has fields to identify one or more operands such as operand 1 2403, operand 2 2405, operand 3 2407, operand 4 2409, operand 5 2411, operand 6 2406 and/or field for an immediate (not shown, but could replace one or more of the operands such as operand 3). The use of those operands and immediate may change. Note that operand 1 2403, operand 2 2405, operand 3 2407, operand 4 2409, operand 5 2411, and operand 6 2404 may be registers or memory locations.

In some embodiments, an ENDOFFLOAD* instruction will include an address of the results of the task which, in this example, is found in operand 1 2403. This address may be in main memory, cache, or disk. Note that in other embodiments, this address is already known to the requesting core and is not included in the In some embodiments, an ENDOFFLOAD* instruction will also include an instruction pointer (shown here as being provided by operand 2 2405). The instruction pointer alerts the originating core as to where the task came from in the original code and would be sent as a part of the offload end indication. The instruction pointer may be maintained by the requesting core instead or, or in addition to, sending to the helper core.

In some embodiments, an ENDOFFLOAD* instruction will include a requesting core ID (shown here as being provided by operand 3 2407). This should be the core receiving the offload end indication.

In some embodiments, an ENDOFFLOAD* instruction will include a helper core ID (shown here as being provided by operand 4 2409). This is the core that performed the offloaded task.

In some embodiments, an ENDOFFLOAD* instruction will include a helper core state location (shown here as being provided by operand 5 2411). This allows the requesting core to load the helper core's state.

In some embodiments, an ENDOFFLOAD* instruction will include a helper core ID. This allows the receiving core to know who sent the message.

Note the information of the operands may be used to generate an offload end indication to be sent from a core to a potential helper core.

In some embodiments, the execution of an ENDOFFLOAD* invokes the core-to-core offload circuitry or core-to-core offload finite state machine 221 to generate the offload end indication. When the instruction does not utilize operand registers, the core-to-core offload circuitry or core-to-core offload finite state machine 221 uses the offload phase tracker 223 to generate the offload end indication.

FIG. 25 illustrates embodiments of a method of processing an endoffload* instruction. Some or all of the operations of the method (or other processes described herein, or variations, and/or combinations thereof) are performed by a processor core in the processing of an instruction.

At 2501 an instruction having fields for an opcode indicating an offload end operation is to be performed and one or more operands providing information for that operation may also be included. Examples of instruction formats may be found in FIG. 24. An instruction is fetched using fetch circuitry such as shown in FIG. 31(B).

The fetched instruction is decoded at 2503 using a decoder circuitry such as shown in FIG. 31(B).

In some embodiments, data associated with the one or more operands is retrieved at 2505.

Execution circuitry executes the decoded instruction according to the opcode at 2507. The execution of the decoded instruction includes causing a generation and a transmission of an offload end indication to the core that had requested the offload, the indication including one or more of an identifier of the core that had requested the offload, a location of where the offload requesting core can find the results of the offload, the results of the offload, an instruction pointer as provided with a corresponding startoffload request, a core state, and/or a core state location. Note the content of the offload start request may be gathered from the operands of the instruction.

For example, in some embodiments, an offload end request comprising an identifier of the core that is request the offload, a location of where the requesting core can find the result, an identifier of the core that performed the offload as a helper, an instruction pointer from the code, a processor state location, and a timestamp is sent. In other embodiments, an offload end request comprising an identifier of the core that is request the offload, a location of where the requesting core can find the result, an identifier of the core that performed the offload as a helper, an instruction pointer from the code, and a timestamp is sent. In other embodiments, an offload end request comprising an identifier of the core that is request the offload, an identifier of the core that performed the offload as a helper, and a timestamp is sent. In these embodiments, the requesting core is already aware of the location of a task (as in that location is pre-defined). These are merely exemplary types of offload end requests that can be sent using the combination of items detailed above.

The execution may also cause a response from the requesting core and an update of the offload phase tracker 223 based on received responses. The handling of the response and updating of the offload phase tracker is done by the core-to-core offload circuitry or core-to-core offload finite state machine 221.

Note that in some embodiments, the core-to-core offload circuitry or core-to-core offload finite state machine 221 determines: which core to offload to, the IP, the task address, etc., and populates that operand information in one or more operands prior to those one or more operands being retrieved.

A result of the executed instruction is committed at VAe09.

Note that when the offload start operation is not executed as an instruction that there is no fetch, decode, etc., but the actions of the execution circuitry are still performed.

FIG. 26 illustrates embodiments of a method of processing an endoffload* instruction. Some or all of the operations of the method (or other processes described herein, or variations, and/or combinations thereof) are performed by a processor core in the processing of an instruction.

At 2601 an instruction having fields for an opcode indicating an offload end operation is to be performed. In some embodiments, one or more operands providing information for that operation are included. Examples of instruction formats may be found in FIG. 24. An instruction is fetched using fetch circuitry such as shown in FIG. 31(B).

The fetched instruction is decoded at 2603 using a decoder circuitry such as shown in FIG. 31(B).

In some embodiments, data associated with the one or more operands is retrieved at 2605.

Execution circuitry executes the decoded instruction according to the opcode at 2607. The execution of the decoded instruction includes causing a generation and transmission of an offload end indication by the core-to-core offload circuitry or core-to-core offload finite state machine to the core that had requested the offload, the indication including one or more of an identifier of the core that had requested the offload, a location of where the offload requesting core can find the results of the offload, the results of the offload, an instruction pointer as provided with a corresponding startoffload request, a core state, and/or a core state location. This information may come from the offload phase tracker zaa23 and/or operands.

For example, in some embodiments, an offload end request comprising an identifier of the core that is request the offload, a location of where the requesting core can find the result, an identifier of the core that performed the offload as a helper, an instruction pointer from the code, a processor state location, and a timestamp is sent. In other embodiments, an offload end request comprising an identifier of the core that is request the offload, a location of where the requesting core can find the result, an identifier of the core that performed the offload as a helper, an instruction pointer from the code, and a timestamp is sent. In other embodiments, an offload end request comprising an identifier of the core that is request the offload, an identifier of the core that performed the offload as a helper, and a timestamp is sent. In these embodiments, the requesting core is already aware of the location of a task (as in that location is pre-defined). These are merely exemplary types of offload end requests that can be sent using the combination of items detailed above.

The execution may also cause a response from the requesting core and an update of the offload phase tracker 223 based on received responses. The handling of the response and updating of the offload phase tracker is done by the core-to-core offload circuitry or core-to-core offload finite state machine 221.

Note that in some embodiments, the core-to-core offload circuitry or core-to-core offload finite state machine 221 determines: which core to offload to, the IP, the task address, etc., and populates that operand information in one or more operands prior to those one or more operands being retrieved.

A result of the executed instruction is committed at 2609.

Note that when the offload start operation is not executed as an instruction that there is no fetch, decode, etc., but the actions of the execution circuitry are still performed.

Figure 27:
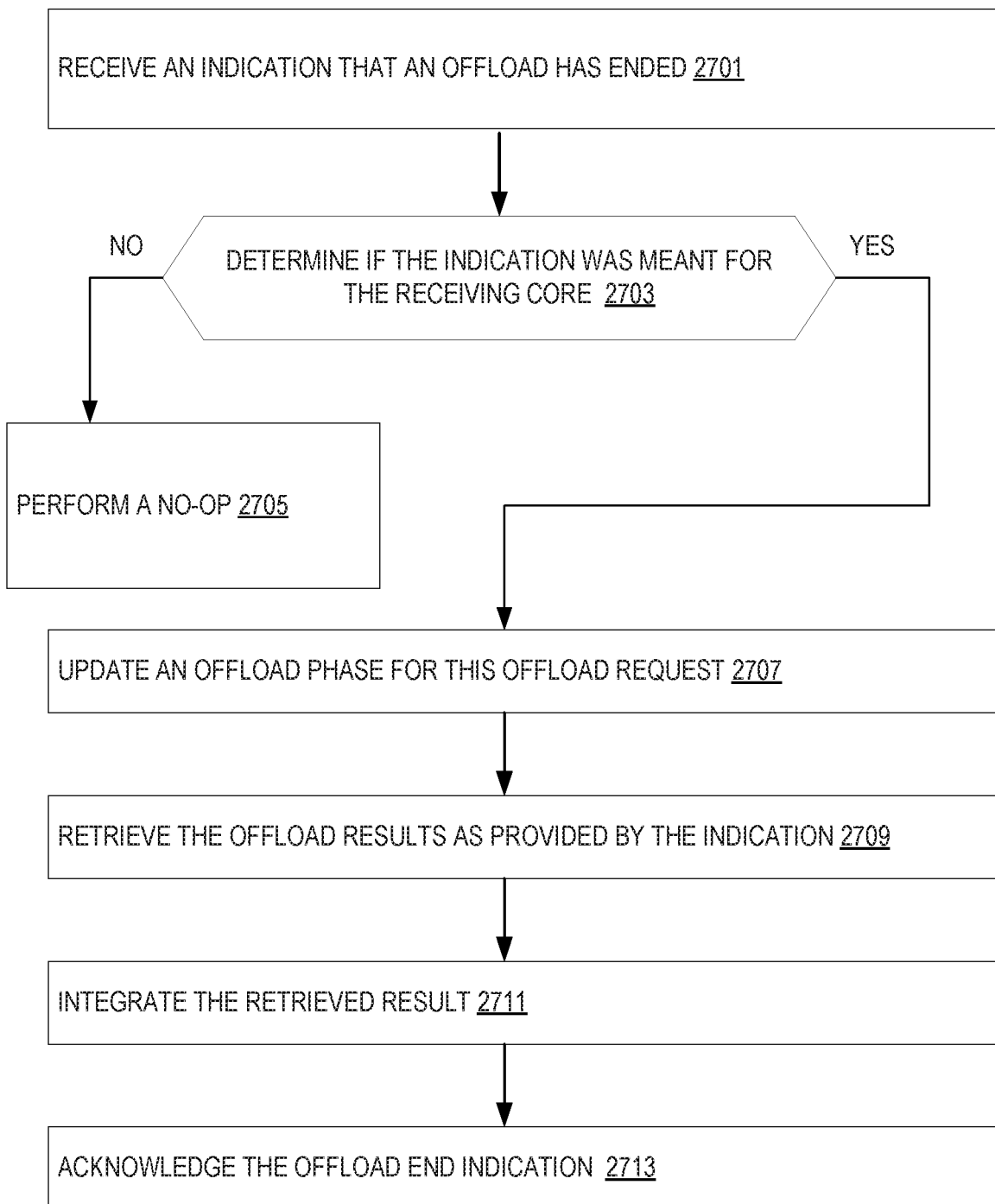
FIG. 27 illustrates embodiments of a method of processing an offload end indication.

FIG. 27 illustrates embodiments of a method of processing an offload end indication. Some or all of the operations of the method (or other processes described herein, or variations, and/or combinations thereof) are performed by the core-to-core offload circuitry or core-to-core offload finite state machine 221.

At 2701 an offload end indication is received. Details on the content of such an indication have been detailed earlier.

A determination of if the offload end indication was meant for the core is made at 2703. If not, a no-op is performed at 2705 in some embodiments. In other embodiments, the receiving core still updates its offload phase tracker 223.

When the request reached the correct core, an update to the offload phase tracker 223 of that core is made using the details of the offload end indication at 2707.

The offload task result is retrieved at 2709 as detailed above.

The receiving core integrates the retrieved result at 2711.

In some embodiments, the end offload indication is acknowledged at 2713.

Figure 28:
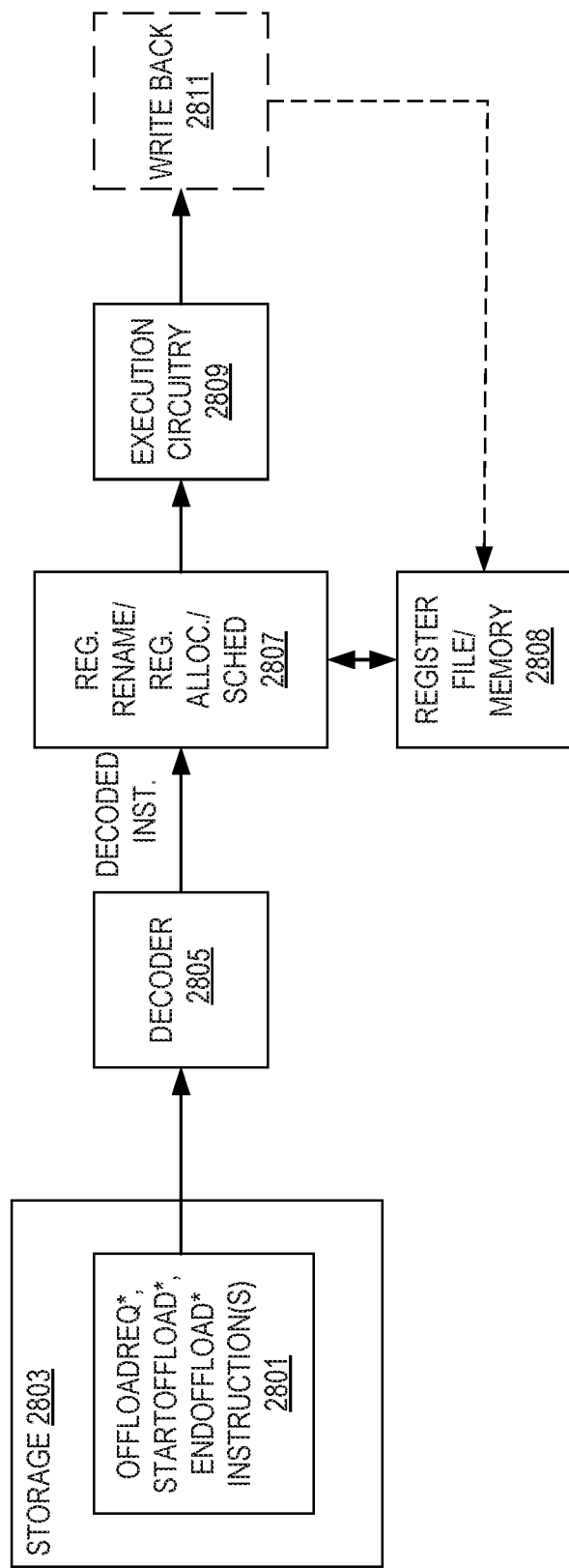
FIG. 28 illustrates an embodiment of hardware to process an instruction such as the OFFLOADREQ*, STARTOFFLOAD*, and ENDOFFLOAD* instructions detailed herein.

FIG. 28 illustrates an embodiment of hardware to process an instruction such as the OFFLOADREQ*, STARTOFFLOAD*, and ENDOFFLOAD* instructions detailed herein. As illustrated, storage 2801 stores one or more of these instructions to be executed.

The instruction is received by decode circuitry 2805. For example, the decode circuitry 2805 receives this instruction from fetch logic/circuitry. The instruction 2801 includes fields as detailed above. In some embodiments, the operand(s) are registers, and in other embodiments one or more are memory locations. More detailed embodiments of at least one instruction format will be detailed later. The decode circuitry 2805 decodes the instruction into one or more operations. In some embodiments, this decoding includes generating a plurality of micro-operations to be performed by execution circuitry (such as execution circuitry). The decode circuitry 2805 also decodes instruction prefixes (if used).

In some embodiments, register renaming, register allocation, and/or scheduling circuitry 2807 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 2808 store data as operands of the instruction to be operated on by execution circuitry. Exemplary register types include packed data registers, general purpose registers, and floating point registers.

Execution circuitry executes 2809 the decoded instruction a detailed above. Write back (retirement) circuitry 2811 commits the result of the execution of the decoded instruction. In some embodiments, retirement/write back circuitry retires the instruction.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (operand1/destination and operand2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 29A is a block diagram illustrating an exemplary instruction format according to embodiments of the invention. FIG. 29A shows an instruction format 2900 that is specific in the sense that it specifies the location, size, interpretation, and order of the fields, as well as values for some of those fields. The instruction format 2900 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions.

EVEX Prefix (Bytes 0-3) 2902—is encoded in a four-byte form.

Format Field 2982 (EVEX Byte 0, bits [7:0])—the first byte (EVEX Byte 0) is the format field 2982 and it contains 0x62 (the unique value used for distinguishing the vector friendly instruction format in one embodiment of the invention).

The second-fourth bytes (EVEX Bytes 1-3) include a number of bit fields providing specific capability.

REX field 2905 (EVEX Byte 1, bits [7-5])—consists of a EVEX.R bit field (EVEX Byte 1, bit [7]-R), EVEX.X bit field (EVEX byte 1, bit [6]-X), and 2957 BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2910—this is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2915 (EVEX byte 1, bits [3:0]-mmmm)—its content encodes an implied leading opcode byte (0F, 0F 38, or 0F 3).

Data element width field 2964 (EVEX byte 2, bit [7]-W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX.vvvv 2920 (EVEX Byte 2, bits [6:3]-vvvv)—the role of EVEX.vvvv may include the following: 1) EVEX.vvvv encodes the first operand register operand, specified in inverted (1s complement) form and is valid for instructions with 2 or more operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 2920 encodes the 4 low-order bits of the first operand register specifier stored in inverted (1s complement) form. Depending on the instruction, an extra different EVEX bit field is used to extend the specifier size to 32 registers.

EVEX.U 2968 Class field (EVEX byte 2, bit [2]-U)—If EVEX.0=0, it indicates class A (support merging-write-masking) or EVEX.U0; if EVEX.0=1, it indicates class B (support zeroing and merging-writemasking) or EVEX.U1.

Prefix encoding field 2925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2953 (EVEX byte 3, bit [7]-EH; also known as EVEX.EH, EVEX.rs, EVEX.RL, EVEX.writemask control, and EVEX.N; also illustrated with α)—its content distinguishes which one of the different augmentation operation types are to be performed.

Beta field 2955 (EVEX byte 3, bits [6:4]-SSS, also known as EVEX.s$_{2-0}$, EVEX.r$_{2-0}$, EVEX.rr1, EVEX.LL0, EVEX.LLB; also illustrated with βββ)—distinguishes which of the operations of a specified type are to be performed.

REX' field 2910—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Writemask field 2971 (EVEX byte 3, bits [2:0]-kkk)—its content specifies the index of a register in the writemask registers. In one embodiment of the invention, the specific value EVEX.kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 2971 allows for partial vector operations, including loads, stores, arithmetic, logical, etc. While embodiments of the invention are described in which the writemask field's 2971 content selects one of a number of writemask registers that contains the writemask to be used (and thus the writemask field's 2971 content indirectly identifies that masking to be performed), alternative embodiments instead or additional allow the mask write field's 2971 content to directly specify the masking to be performed.

Real Opcode Field 2930 (Byte 4) is also known as the opcode byte. Part of the opcode is specified in this field.

MOD R/M Field 2940 (Byte 5) includes MOD field 2942, register index field 2944, and R/M field 2946. The MOD field's 2942 content distinguishes between memory access and non-memory access operations. The role of register index field 2944 can be summarized to two situations: encoding either the destination register operand or a operand register operand, or be treated as an opcode extension and not used to encode any instruction operand. The content of register index field 2944, directly or through address generation, specifies the locations of the operand and destination operands, be they in registers or in memory. These include a sufficient number of bits to select N registers from a P×Q (e.g. 32×512, 16×128, 32×1024, 64×1024) register file. While in one embodiment N may be up to three operands and one destination register, alternative embodiments may support more or less operands and destination registers (e.g., may support up to two operands where one of these operands also acts as the destination, may support up to three operands where one of these operands also acts as the destination, may support up to two operands and one destination).

The role of RIM field 2946 may include the following: encoding the instruction operand that references a memory address, or encoding either the destination register operand or a operand register operand.

Scale, Index, Base (SIB) Byte (Byte 6)—The scale field's 2950 content allows for the scaling of the index field's content for memory address generation (e.g., for address generation that uses $2^{scale}$*index+base). SIB.xxx 2954 and SIB.bbb 2956—the contents of these fields have been previously referred to with regard to the register indexes Xxxx and Bbbb.

Displacement field 2963A (Bytes 7-10)—when MOD field 2942 contains 10, bytes 7-10 are the displacement field 2963A, and it works the same as the legacy 32-bit displacement (disp32) and works at byte granularity. This may be used as part of memory address generation (e.g., for address generation that uses $2^{scale}$*index+base+displacement).

Displacement factor field 2963B (Byte 7)—when MOD field 2942 contains 01, byte 7 is the displacement factor field 2963B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2963B is a reinterpretation of disp8; when using displacement factor field 2963B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2963B substitutes the legacy x86 instruction set 8-bit displacement. Thus, the displacement factor field 2963B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 2972 allows for the specification of an immediate. This field is optional in the sense that is it not present in an implementation of the generic vector friendly format that does not support immediate and it is not present in instructions that do not use an immediate.

Full Opcode Field

FIG. 29B is a block diagram illustrating the fields of the instruction format 2900 that make up the full opcode field

2974 according to one embodiment of the invention. Specifically, the full opcode field 2974 includes the format field 2982, the base operation field 2943, and the data element width (W) field 2963. The base operation field 2943 includes the prefix encoding field 2925, the opcode map field 2915, and the real opcode field 2930.

Register Index Field

FIG. 29C is a block diagram illustrating the fields of the format 2900 that make up the register index field 2945 according to one embodiment of the invention. Specifically, the register index field 2945 includes the REX field 2905, the REX' field 2910, the MODR/M.reg field 2944, the MODR/M.r/m field 2946, the VVVV field 2920, xxx field 2954, and the bbb field 2956.

Augmentation Operation Field

Figure 29D:
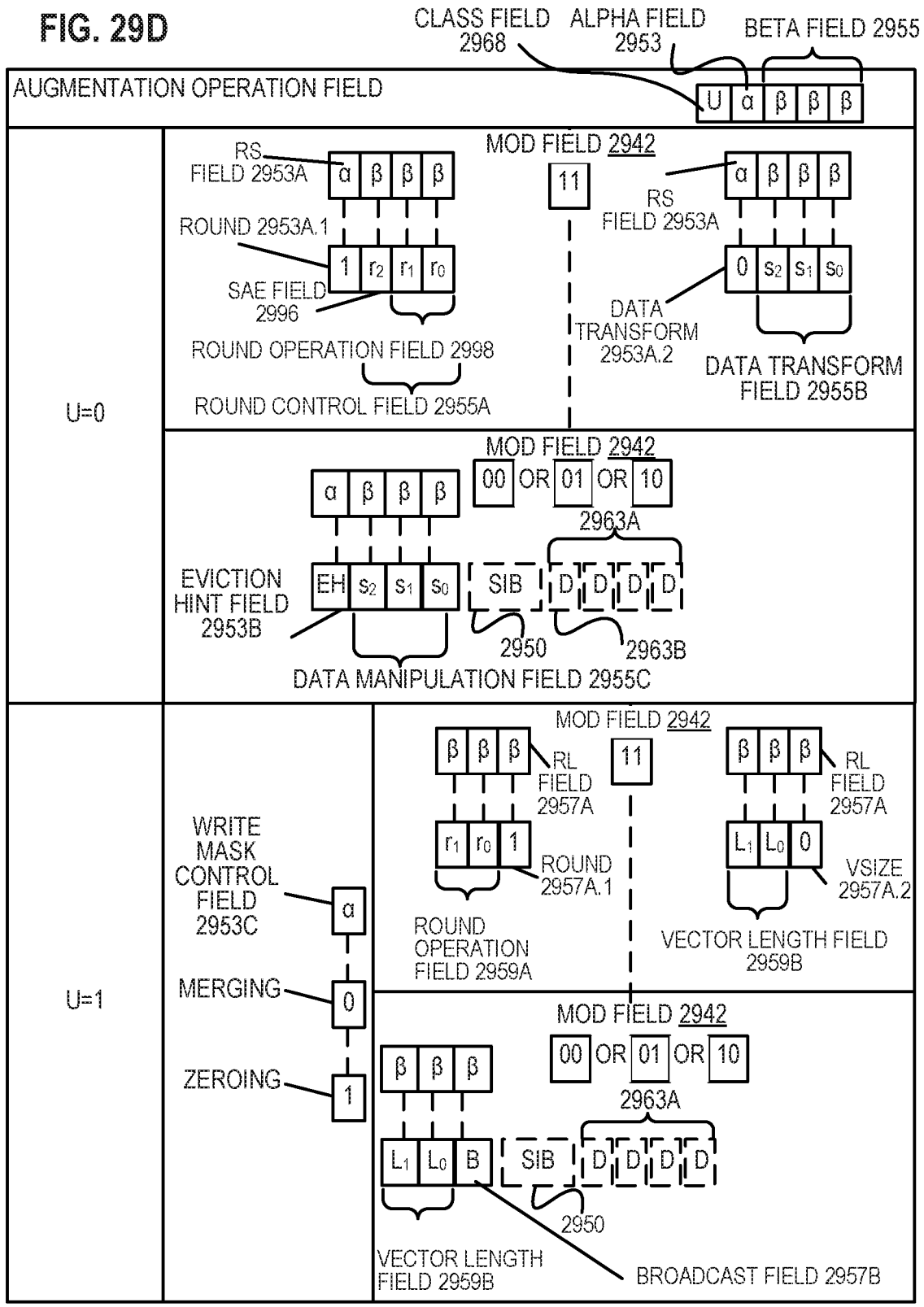
FIG. 29D is a block diagram illustrating the fields of the instruction format that make up the augmentation operation field according to one embodiment of the invention.

FIG. 29D is a block diagram illustrating the fields of the instruction format 2900 that make up an augmentation operation field according to one embodiment of the invention. When the class (U) field 2968 contains 0, it signifies EVEX.U0 (class A 2968A); when it contains 1, it signifies EVEX.U1 (class B 2968B). When U=0 and the MOD field 2942 contains 11 (signifying a no memory access operation), the alpha field 2953 (EVEX byte 3, bit [7]-EH) is interpreted as the rs field 2953A. When the rs field 2953A contains a 1 (round 2953A.1), the beta field 2955 (EVEX byte 3, bits [6:4]-SSS) is interpreted as the round control field 2955A. The round control field 2955A includes a one bit SAE field 2996 and a two bit round operation field 2998. When the rs field 2953A contains a 0 (data transform 2953A.2), the beta field 2955 (EVEX byte 3, bits [6:4]-SSS) is interpreted as a three bit data transform field 2955B. When U=0 and the MOD field 2942 contains 00, 01, or 10 (signifying a memory access operation), the alpha field 2953 (EVEX byte 3, bit [7]-EH) is interpreted as the eviction hint (EH) field 2953B and the beta field 2955 (EVEX byte 3, bits [6:4]-SSS) is interpreted as a three bit data manipulation field 2955C.

When U=1, the alpha field 2953 (EVEX byte 3, bit [7]-EH) is interpreted as the writemask control (Z) field 2953C. When U=1 and the MOD field 2942 contains 11 (signifying a no memory access operation), part of the beta field 2955 (EVEX byte 3, bit [4]-$S_0$) is interpreted as the RL field 2957A; when it contains a 1 (round 2957A.1) the rest of the beta field 2955 (EVEX byte 3, bit [6-5]-$S_{2-1}$) is interpreted as the round operation field 2959A, while when the RL field 2957A contains a 0 (VSIZE 2957.A2) the rest of the beta field 2955 (EVEX byte 3, bit [6-5]-$S_{2-1}$) is interpreted as the vector length field 2959B (EVEX byte 3, bit [6-5]-$L_{1-0}$). When U=1 and the MOD field 2942 contains 00, 01, or 10 (signifying a memory access operation), the beta field 2955 (EVEX byte 3, bits [6:4]-SSS) is interpreted as the vector length field 2959B (EVEX byte 3, bit [6-5]-$L_{1-0}$) and the broadcast field 2957B (EVEX byte 3, bit [4]-B).

Exemplary Register Architecture

Figure 30:
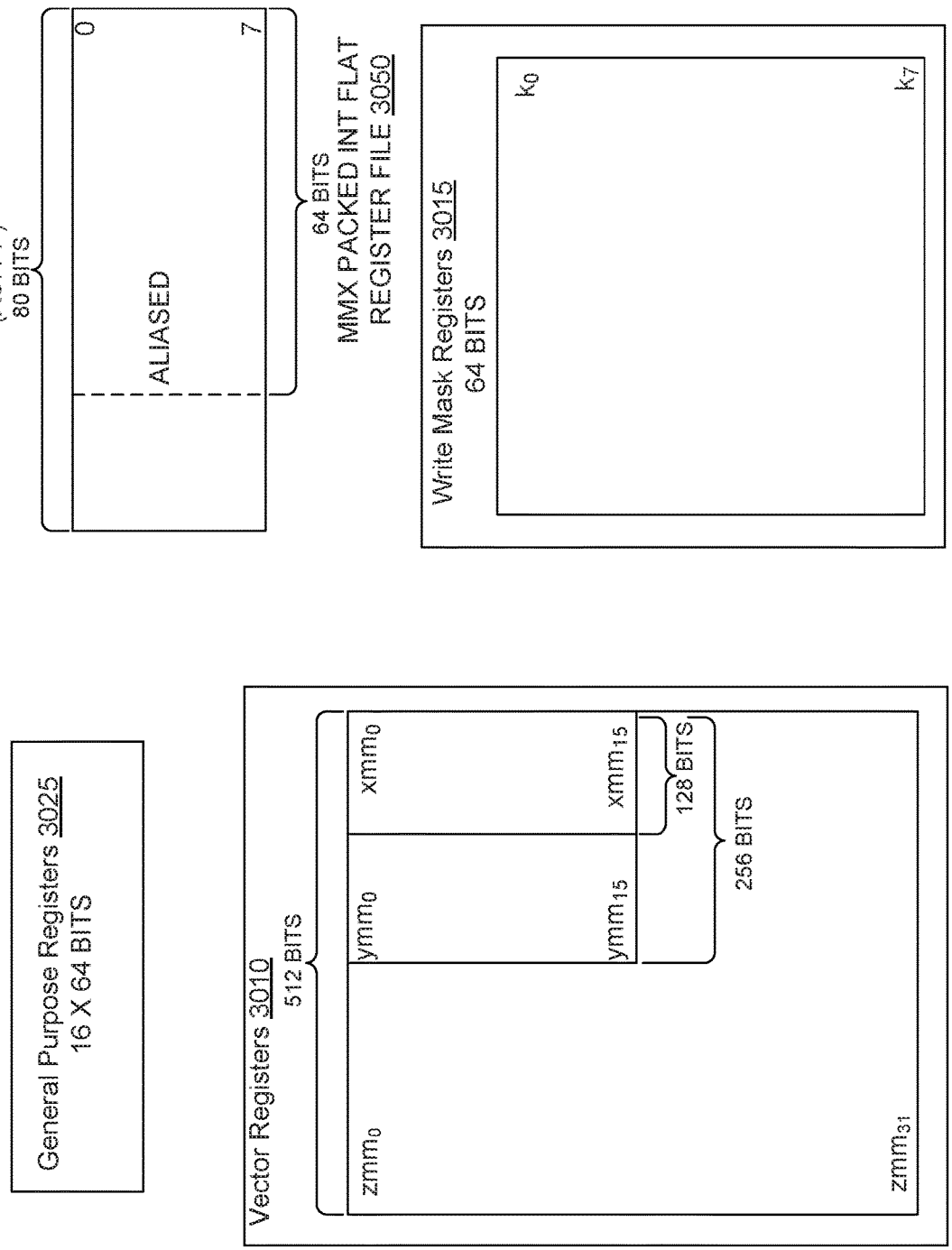
FIG. 30 is a block diagram of a register architecture according to one embodiment of the invention.
Figure 33:
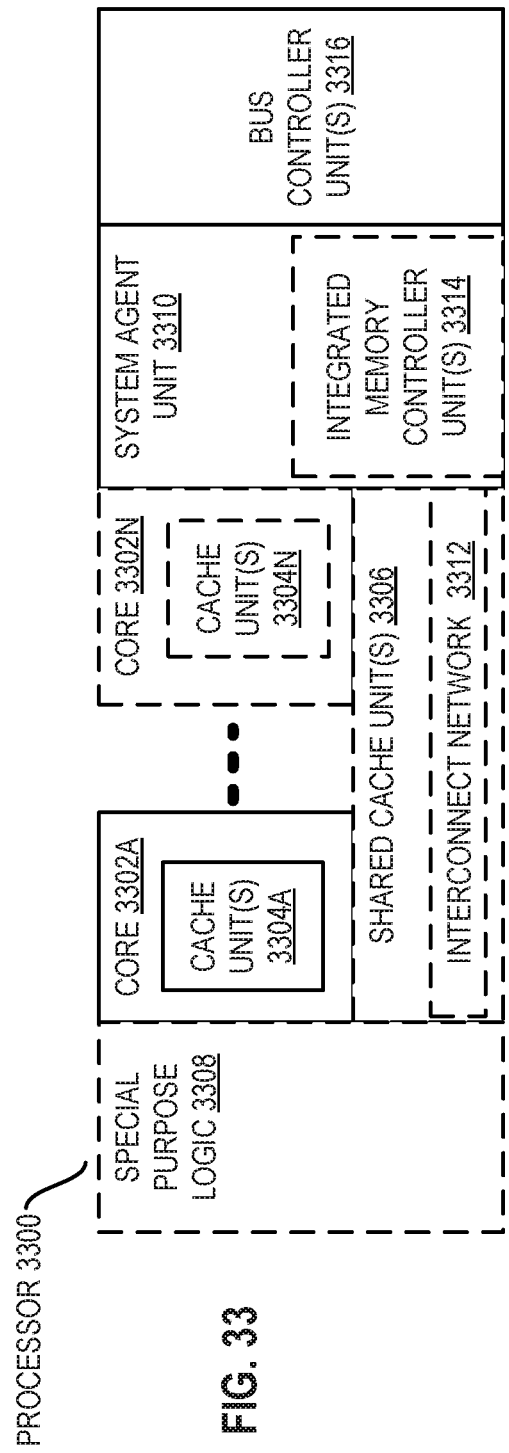
FIG. 33 is a block diagram of a processor that may have more than one core, may have an integrated memory controller, and may have integrated graphics according to embodiments of the invention.
Figure 34:
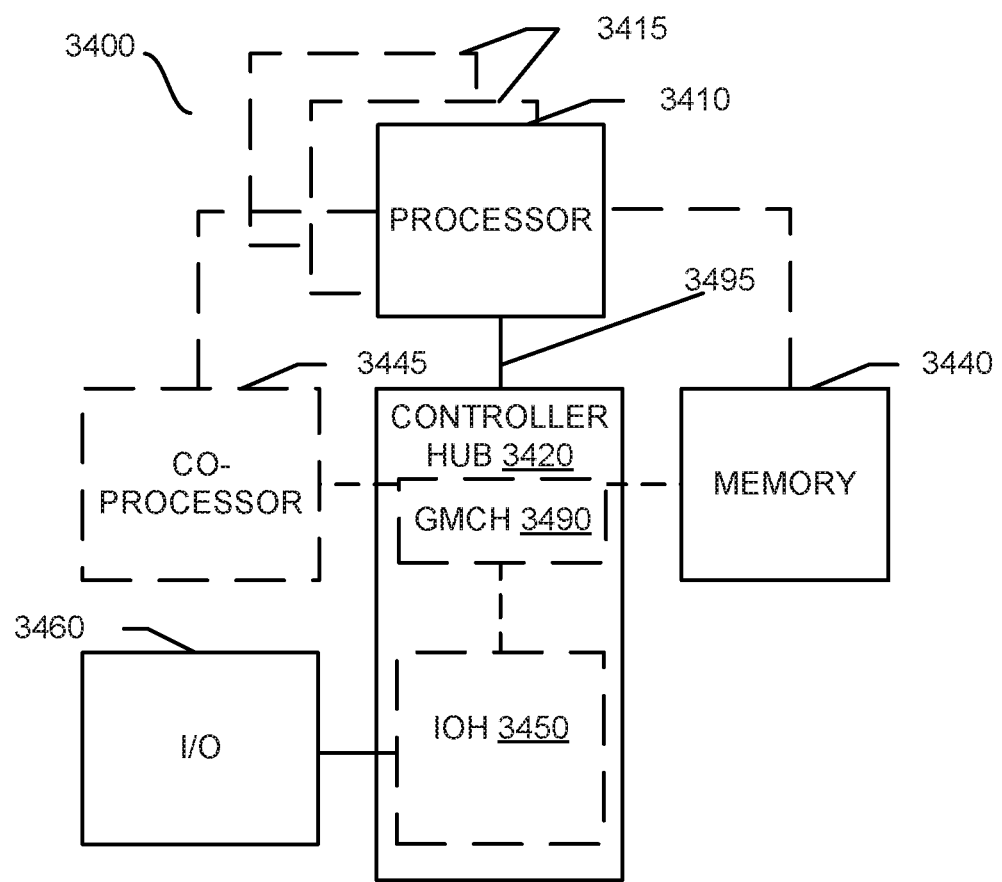
FIG. 34 shown a block diagram of a system in accordance with one embodiment of the present invention.
Figure 35:
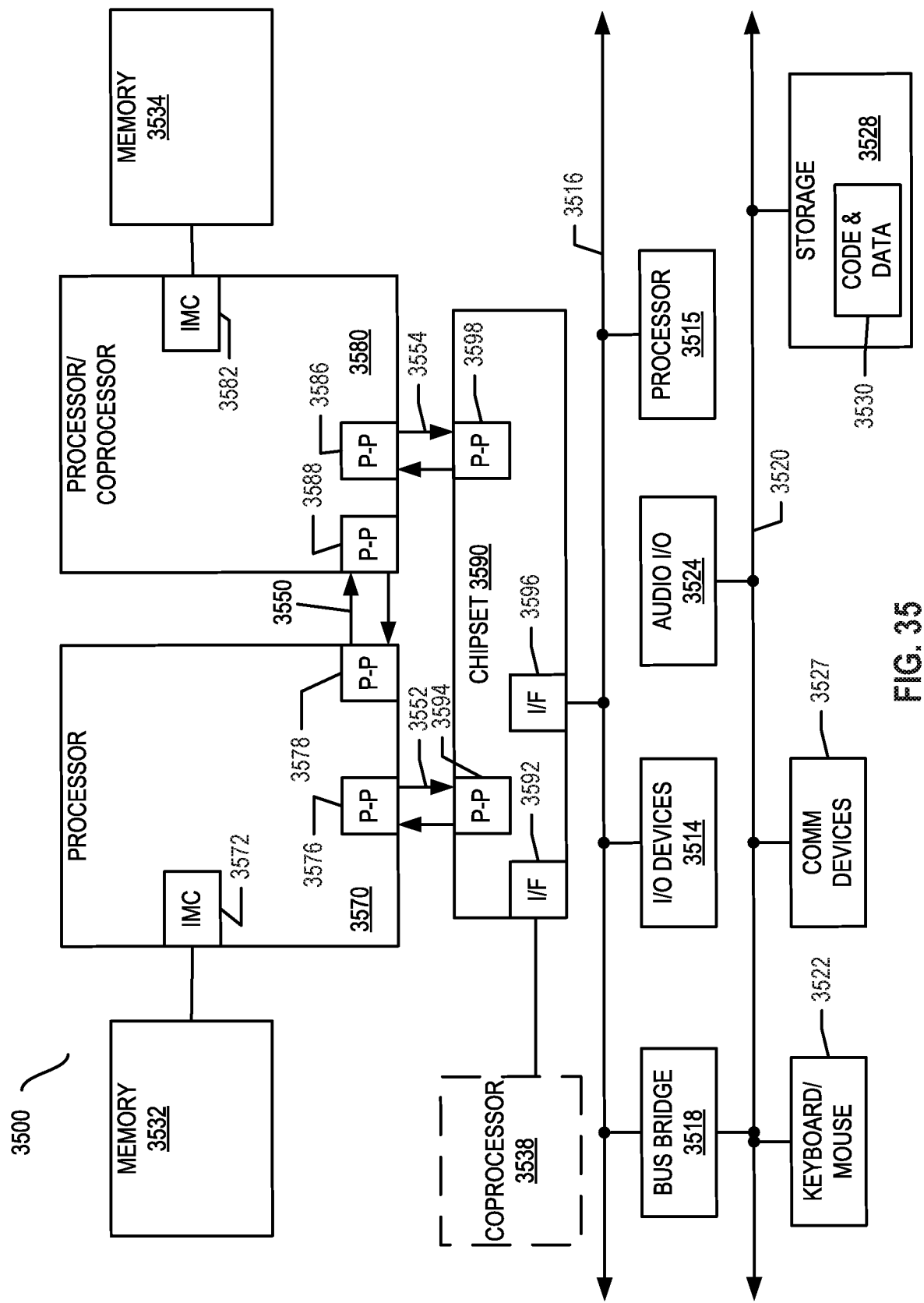
FIG. 35 is a block diagram of a first more specific exemplary system in accordance with an embodiment of the present invention.
Figure 36:
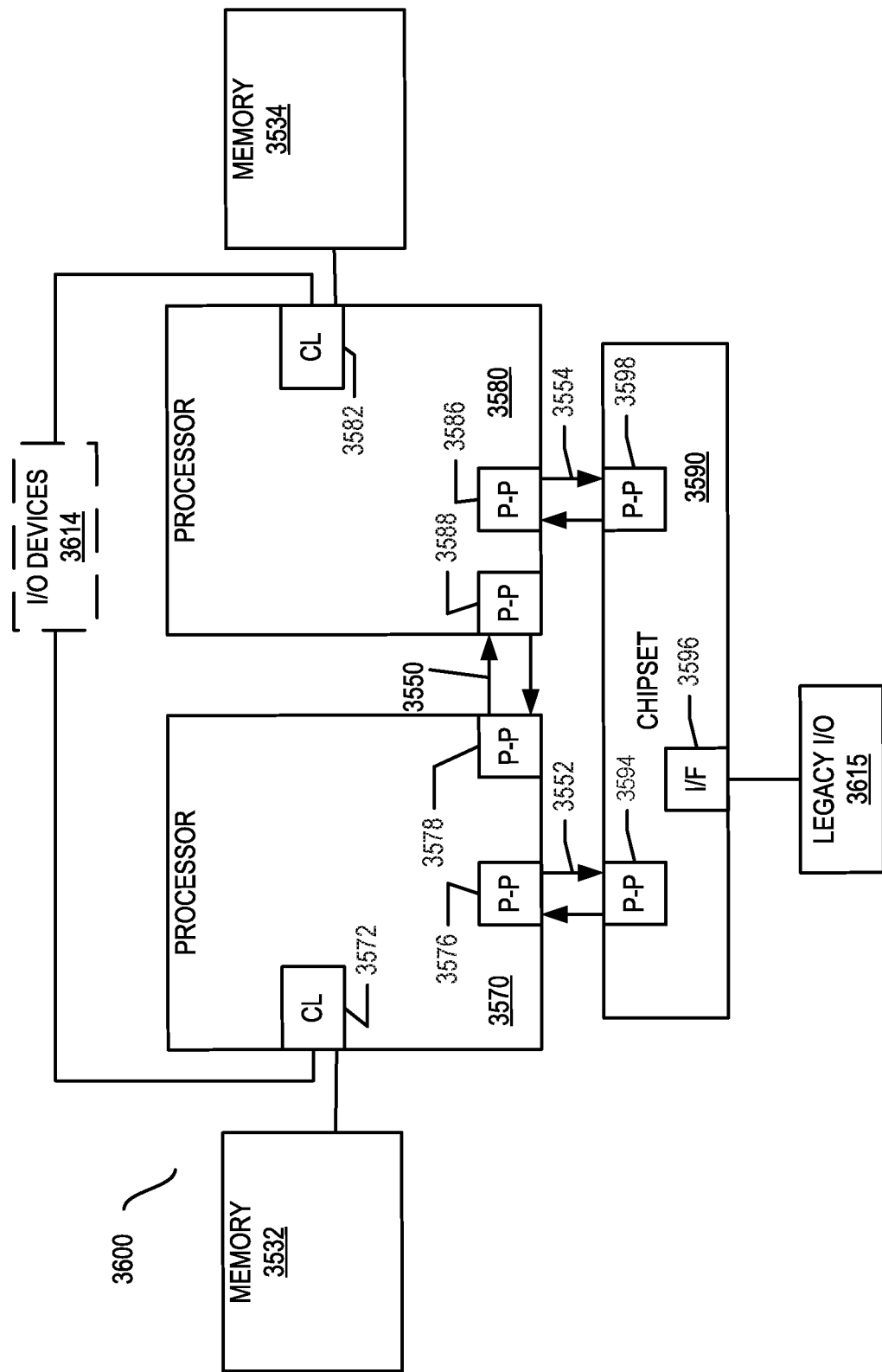
FIG. 36 is a block diagram of a second more specific exemplary system in accordance with an embodiment of the present invention.
Figure 37:
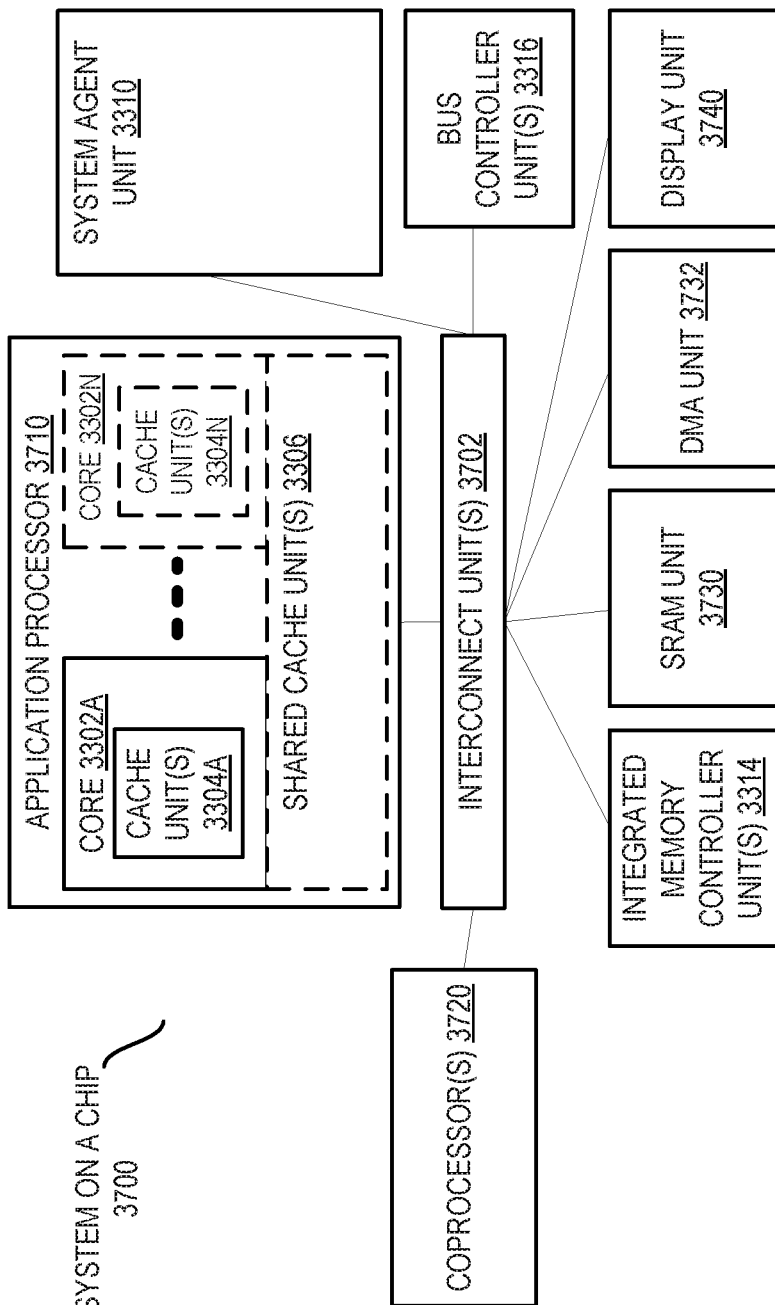
FIG. 37 is a block diagram of a SoC in accordance with an embodiment of the present invention.
Figure 38:
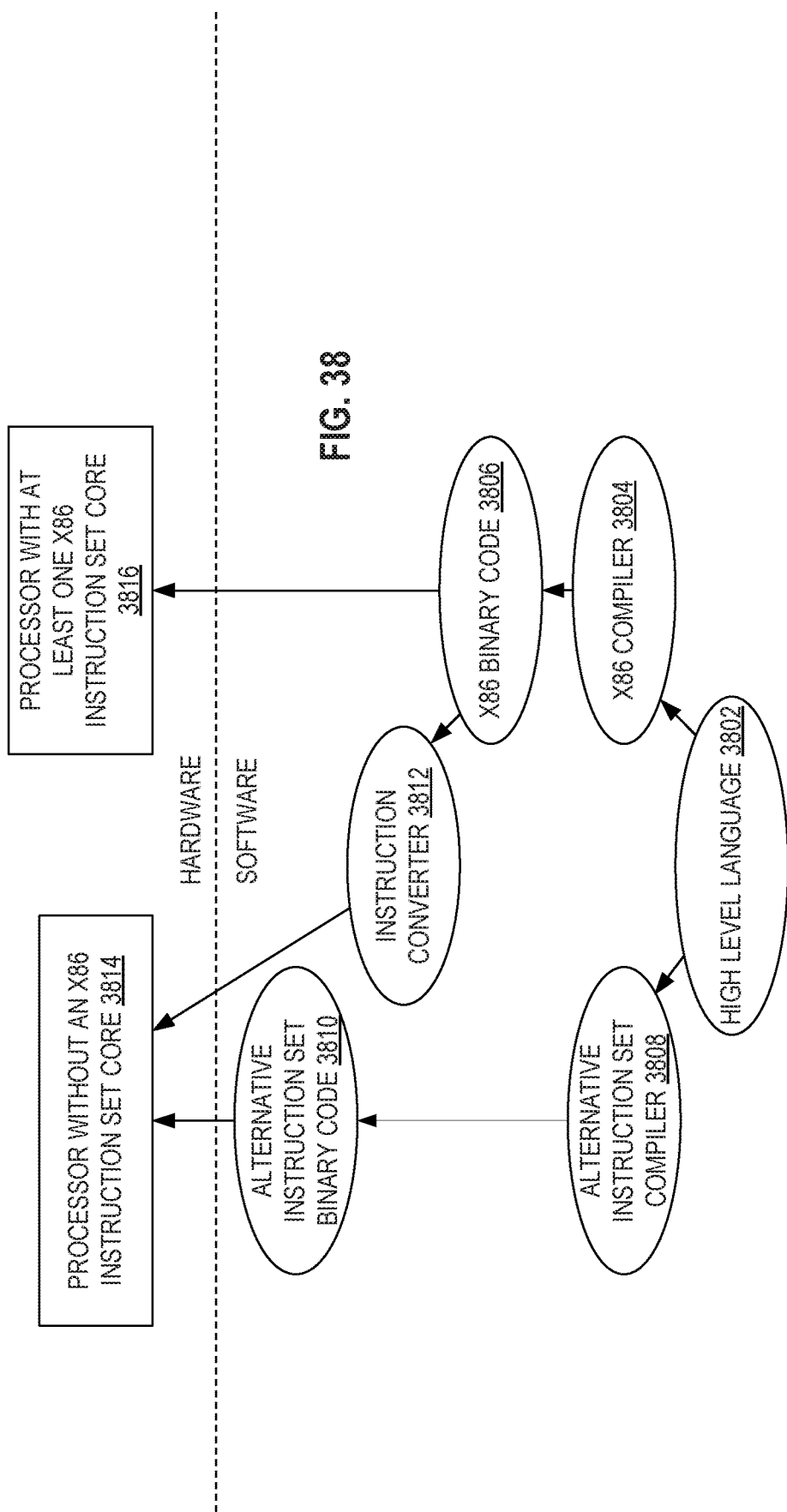
FIG. 38 is a block diagram contrasting the use of a software instruction converter to convert binary instructions in a operand instruction set to binary instructions in a target instruction set according to embodiments of the invention.

FIG. 30 is a block diagram of a register architecture 3000 according to one embodiment of the invention. In the embodiment illustrated, there are 32 vector registers 3010 that are 512 bits wide; these registers are referenced as ZMM0 through ZMM31. The lower order 256 bits of the lower 16 ZMM registers are overlaid on registers YMM0-16. The lower order 128 bits of the lower 16 ZMM registers (the lower order 128 bits of the YMM registers) are overlaid on registers XMM0-15. In other words, the vector length field 2959B selects between a maximum length and one or more other shorter lengths, where each such shorter length is half the length of the preceding length; and instructions templates without the vector length field 2959B operate on the maximum vector length. Further, in one embodiment, the class B instruction templates of the instruction format 2900 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 3015—in the embodiment illustrated, there are 8 writemask registers (k0 through k7), each 64 bits in size. In an alternate embodiment, the writemask registers 3015 are 16 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 3025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 3045, on which is aliased the MMX packed integer flat register file 3050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 31A is a block diagram illustrating both an exemplary in-order pipeline and an exemplary register renaming, out-of-order issue/execution pipeline according to embodiments of the invention. FIG. 31B is a block diagram illustrating both an exemplary embodiment of an in-order architecture core and an exemplary register renaming, out-of-order issue/execution architecture core to be included in a processor according to embodiments of the invention. The solid lined boxes in FIGS. 31A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 31A, a processor pipeline 3100 includes a fetch stage 3102, a length decode stage 3104, a decode stage 3106, an allocation stage 3108, a renaming stage 3110, a scheduling (also known as a dispatch or issue) stage 3112, a register read/memory read stage 3114, an execute stage 3116, a write back/memory write stage 3118, an exception handling stage 3122, and a commit stage 3124.

FIG. 31B shows processor core 3190 including a front end unit 3130 coupled to an execution engine unit 3150, and both are coupled to a memory unit 3170. The core 3190 may be a reduced instruction set computing (RISC) core, a complex instruction set computing (CISC) core, a very long instruction word (VLIW) core, or a hybrid or alternative core type. As yet another option, the core 3190 may be a special-purpose core, such as, for example, a network or communication core, compression engine, coprocessor core, general purpose computing graphics processing unit (GPGPU) core, graphics core, or the like.

The front end unit 3130 includes a branch prediction unit 3132 coupled to an instruction cache unit 3134, which is coupled to an instruction translation lookaside buffer (TLB) 3136, which is coupled to an instruction fetch unit 3138, which is coupled to a decode unit 3140. The decode unit 3140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 3140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3190 includes a microcode ROM or other medium that stores microcode for certain macroinstructions (e.g., in decode unit 3140 or otherwise within the front end unit 3130). The decode unit 3140 is coupled to a rename/allocator unit 3152 in the execution engine unit 3150.

The execution engine unit 3150 includes the rename/allocator unit 3152 coupled to a retirement unit 3154 and a set of one or more scheduler unit(s) 3156. The scheduler unit(s) 3156 represents any number of different schedulers, including reservations stations, central instruction window, etc. The scheduler unit(s) 3156 is coupled to the physical register file(s) unit(s) 3158. Each of the physical register file(s) units 3158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 3158 comprises a vector registers unit, a writemask registers unit, and a scalar registers unit. These register units may provide architectural vector registers, vector mask registers, and general purpose registers. The physical register file(s) unit(s) 3158 is overlapped by the retirement unit 3154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3154 and the physical register file(s) unit(s) 3158 are coupled to the execution cluster(s) 3160. The execution cluster(s) 3160 includes a set of one or more execution units 3162 and a set of one or more memory access units 3164. The execution units 3162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3156, physical register file(s) unit(s) 3158, and execution cluster(s) 3160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3164). It should also be understood that where separate pipelines are used, one or more of these pipelines may be out-of-order issue/execution and the rest in-order.

The set of memory access units 3164 is coupled to the memory unit 3170, which includes a data TLB unit 3172 coupled to a data cache unit 3174 coupled to a level 2 (L2) cache unit 3176. In one exemplary embodiment, the memory access units 3164 may include a load unit, a store address unit, and a store data unit, each of which is coupled to the data TLB unit 3172 in the memory unit 3170. The instruction cache unit 3134 is further coupled to a level 2 (L2) cache unit 3176 in the memory unit 3170. The L2 cache unit 3176 is coupled to one or more other levels of cache and eventually to a main memory.

By way of example, the exemplary register renaming, out-of-order issue/execution core architecture may implement the pipeline 3100 as follows: 1) the instruction fetch 3138 performs the fetch and length decoding stages 3102 and 3104; 2) the decode unit 3140 performs the decode stage 3106; 3) the rename/allocator unit 3152 performs the allocation stage 3108 and renaming stage 3110; 4) the scheduler unit(s) 3156 performs the schedule stage 3112; 5) the physical register file(s) unit(s) 3158 and the memory unit 3170 perform the register read/memory read stage 3114; the execution cluster 3160 perform the execute stage 3116; 6) the memory unit 3170 and the physical register file(s) unit(s) 3158 perform the write back/memory write stage 3118; 7) various units may be involved in the exception handling stage 3122; and 8) the retirement unit 3154 and the physical register file(s) unit(s) 3158 perform the commit stage 3124.

The core 3190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3190 includes logic to support a packed data instruction set extension (e.g., AVX1, AVX2), thereby allowing the operations used by many multimedia applications to be performed using packed data.

Examples of processors, methods, etc. detailed herein include, but are not limited to:

Example 1. A processor comprising:
  a plurality of cores including at least a first and a second core;
  the first core comprising:
    decode circuitry to decode an instruction having fields for at least an opcode to indicate an offload request availability operation is to be performed and one or more operands to provide information for that operation, and
    execution circuitry to execute the decoded instruction to:
      cause a transmission of an offload availability request to one or more cores of the processor, the offload availability request to include at least one of an identification of the requesting core and an indication of the type of availability requested from the one or more cores of the processor, wherein a core receiving the offload availability request is to determine whether that receiving core is able to act has a helper core for the first core to perform one or more tasks on behalf of the first core; and
  the second core comprising:
    performance monitoring circuitry to monitor performance of the second core.

Example 2. The processor of example 1, wherein the indication of the type of availability requested from the one or more cores of the processor is one of compute, memory, and input/output.

Example 3. The processor of any of examples 1-2 wherein a response to the offload availability request from one or more cores of the processor is to be generated at least in part based on state information stored by the performance monitoring circuitry.

Example 4. The processor of any of examples 1-3, wherein the first core further comprises:
  an offload phase tracker to maintain status information about at least the first core regarding any task offloaded from the first core and any task being performed by the first core as a helper.

Example 5. The processor of example 4, wherein the offload phase tracker is to be maintained by a core-to-core finite state machine.

Example 6. The processor of any of examples 1-5, wherein the performance monitoring circuitry is to track events including one or more of:
  a number of instructions of any type retired;
  a number of unhalted core cycles;
  a number of cache misses;
  a number of cache access;
  a number of branch instructions retired;
  a number of branch misses retired; and
  a number of available slots.

Example 7. The processor of any of examples 1-6, further comprising:
  an interconnect to couple the first and second cores.

Example 8. The processor of any of examples 1-7, further comprising:
  core-to-core offload execution circuitry to receive a response to the offload availability request from one or more cores of the processor and update an offload phase value from the responding one or more cores.

Example 9. A processor comprising:
  a plurality of cores including at least a first and a second core;
  the first core comprising:
    decode circuitry to decode an instruction having fields for at least an opcode to indicate an offload request availability operation is to be performed, and
    execution circuitry to execute the decoded instruction to cause a generation and transmission of an offload availability request to one or more cores of the processor, the offload availability request to include at least one of an identification of the requesting core and an indication of the type of availability requested from the one or more cores of the processor, wherein a core receiving the offload availability request is to determine whether that receiving core is able to act has a helper core for the first core to perform one or more tasks on behalf of the first core; and
  the second core comprising:
    performance monitoring circuitry to monitor performance of the second core.

Example 10. The processor of example 9, wherein the indication of the type of availability requested from the one or more cores of the processor is one of compute, memory, and input/output.

Example 11. The processor of any of examples 9-10, wherein a response to the offload availability request from one or more cores of the processor is to be generated at least in part based on state information stored by the performance monitoring circuitry.

Example 12. The processor of any of examples 9-10, wherein the first core further comprises:
  an offload phase tracker to maintain status information about at least the first core regarding any task offloaded from the first core and any task being performed by the first core as a helper.

Example 13. The processor of example 12, wherein the offload phase tracker is to be maintained by a core-to-core finite state machine.

Example 14. The processor of any of examples 9-13, wherein the performance monitoring circuitry is to track events including one or more of:
  a number of instructions of any type retired;
  a number of unhalted core cycles;
  a number of cache misses;
  a number of cache access;
  a number of branch instructions retired;
  a number of branch misses retired; and
  a number of available slots.

Example 15. The processor of any of examples 9-14, further comprising:
  an interconnect to couple the first and second cores.

Example 16. The processor of any of examples 9-15, further comprising:
  core-to-core offload execution circuitry to receive a response to the offload availability request from one or more cores of the processor and update an offload phase value from the responding one or more cores.

Example 17. A method comprising:
  decoding an instruction having fields for at least an opcode to indicate an offload request availability operation is to be performed; and
  execution circuitry to execute the decoded instruction to cause a generation and transmission of an offload availability request to one or more cores of the processor, the offload availability request to include at least one of an identification of the requesting core and an indication of the type of availability requested from the one or more cores of the processor, wherein a core receiving the offload availability request is to determine whether that receiving core is able to act has a helper core for the first core to perform one or more tasks on behalf of the first core.

Example 17. A method comprising:
  decoding an instruction having fields for at least an opcode to indicate an offload request availability operation is to be performed; and
  execution circuitry to execute the decoded instruction to cause a generation and transmission of an offload availability request to one or more cores of the processor, the offload availability request to include at least one of an identification of the requesting core and an indication of the type of availability requested from the one or more cores of the processor, wherein a core receiving the offload availability request is to determine whether that receiving core is able to act has a helper.

Example 18. The method of example 17, further comprising:
  receiving a response to the offload availability request from one or more cores of the processor and updating an offload phase value from the responding one or more cores.

Example 19. The method of example 17, further comprising:
  maintaining status information about at least the first core regarding any task offloaded from the first core and any task being performed by the first core as a helper.

Example 20. A non-transitory machine readable medium having stored thereon an instruction which when processed by a machine is to perform any of the methods of examples 17-19.

Example 21. A processor comprising:
  a plurality of cores including at least a first and a second core;
  the first core comprising:
    performance monitoring circuitry to monitor performance of the first core,
    core-to-core offload circuitry to:
      determine an offload availability status of the first core based at least in part on values store in the performance monitoring circuitry, and
      transmit an availability indication to the second core of an availability of the first core to act as a helper core to perform one or more tasks on behalf of the second core based upon the determined offload availability status of the first core,
    execution circuitry to execute decoded instructions of the one or more tasks of the second core; and
  the second core comprising:
    execution circuitry to execute decoded instructions of the one or more tasks of the second core, and
    an offload phase tracker to maintain status information about at least an availability of the first core to act as a helper core.

Example 22. The processor of example 21, wherein the availability indication is to include a type of availability available including one of compute, memory, and input/output.

Example 23. The processor of example 21, wherein the availability indication is to be periodically transmitted.

Example 24. The processor of example 21, wherein the availability indication is to be transmitted only when there is a determination of a change in the availability of the first core.

Example 25. The processor of any of examples 21-24, wherein the offload phase tracker is to be maintained by a core-to-core finite state machine.

Example 26. The processor of any of examples 21-25, wherein the performance monitoring circuitry is to track events including one or more of:
  a number of instructions of any type retired;
  a number of unhalted core cycles;
  a number of cache misses;
  a number of cache access;
  a number of branch instructions retired;
  a number of branch misses retired; and
  a number of available slots.

Example 27. The processor of any of examples 21-26, wherein the indication of the first core to act as a helper core to perform one or more tasks on behalf of the second core is not routed through an operating system.

Example 28. A method comprising:
  monitoring performance of a first core using performance monitoring circuitry;
  determining a core-to-core offload availability status of the first core based at least in part on values store in the performance monitoring circuitry; and
  transmitting an availability indication to a second core of an availability of the first core to act as a helper core to perform one or more tasks on behalf of the second core based upon the determined offload availability status of the first core.

Example 29. The method of example 28, wherein the availability indication is to include a type of availability available including one of compute, memory, and input/output.

Example 30. The method of example 28, wherein the availability indication is to be periodically transmitted.

Example 31. The method of example 28, wherein the availability indication is to be transmitted only when there is a determination of a change in the availability of the first core.

Example 32. The method of any of examples 28-31, wherein the offload phase tracker is to be maintained by a core-to-core finite state machine.

Example 33. The method of any of examples 28-32, wherein the performance monitoring circuitry is to track events including one or more of:
  a number of instructions of any type retired;
  a number of unhalted core cycles;
  a number of cache misses;
  a number of cache access;
  a number of branch instructions retired;
  a number of branch misses retired; and
  a number of available slots.

Example 34. The method of any of examples 28-33, wherein the indication of the first core to act as a helper core to perform one or more tasks on behalf of the second core is not routed through an operating system.

Example 35. A system comprising:
a memory to store an offload task;
a plurality of cores including at least a first and a second core;
the first core comprising:
performance monitoring circuitry to monitor performance of the first core,
core-to-core offload circuitry to:
determine an offload availability status of the first core to handle the stored offload task based at least in part on values store in the performance monitoring circuitry, and
transmit an availability indication to the second core of an availability of the first core to act as a helper core to perform one or more tasks on behalf of the second core based upon the determined offload availability status of the first core,
execution circuitry to execute decoded instructions of the one or more tasks of the second core; and
the second core comprising:
execution circuitry to execute decoded instructions of the one or more tasks of the second core, and
an offload phase tracker to maintain status information about at least an availability of the first core to act as a helper core.

Example 36. The system of example 35, wherein the availability indication is to include a type of availability available including one of compute, memory, and input/output.

Example 37. The system of example 35, wherein the availability indication is to be periodically transmitted.

Example 38. The system of example 35, wherein the availability indication is to be transmitted only when there is a determination of a change in the availability of the first core.

Example 39. The system of example 35, wherein the offload phase tracker is to be maintained by a core-to-core finite state machine.

Example 40. A non-transitory machine readable medium having stored thereon an instruction which when processed by a machine is to perform any of the methods of examples 28-35.

Example 41. A processor comprising:
a plurality of cores including at least a first and a second core;
the first core comprising:
performance monitoring circuitry to monitor performance of the first core,
an offload phase tracker to maintain status information about at least an availability of the second core to act as a helper core for the first core,
decode circuitry to decode an instruction having fields for at least an opcode to indicate a start a task offload operation is to be performed and one or more operands to provide information, and
execution circuitry to execute the decoded instruction to:
cause a transmission an offload start request to at least the second core as indicated by the one or more operands, the offload start request including one or more of: an identifier of the first core, a location of where the second core can find the task to perform, an identifier of the second core, an instruction pointer from the code that the task is a proper subset of, a requesting core state, and a requesting core state location,
receive a response from the second core, and
update status information regarding the second core in the offload phase tracker; and
the second core comprising:
memory access circuitry to retrieve the task to perform from the location provided by the offload start request; and
execution circuitry to execute the retrieved task to perform.

Example 42. The processor of example 41, wherein the second core is not one of compute, memory, or input/output constraint bound.

Example 43. The processor of any of examples 41-42, wherein the location provided by the offload start request is in cache shared between the first core and second core.

Example 44. The processor of any of examples 41-42, wherein the location provided by the offload start request is in a memory location external to the first core and second core.

Example 45. The processor of any of examples 41-44, wherein the offload phase tracker is to be maintained by a core-to-core finite state machine.

Example 46. The processor of any of examples 41-45, wherein the performance monitoring circuitry is to track events including one or more of:
a number of instructions of any type retired;
a number of unhalted core cycles;
a number of cache misses;
a number of cache access;
a number of branch instructions retired;
a number of branch misses retired; and
a number of available slots.

Example 47. The processor of any of examples 41-46, wherein the offload start request is to be transmitted to plurality of cores including the second core.

Example 48. A processor comprising:
a plurality of cores including at least a first and a second core;
the first core comprising:
performance monitoring circuitry to monitor performance of the first core,
an offload phase tracker to maintain status information about at least an availability of the second core to act as a helper core for the first core,
decode circuitry to decode an instruction having fields for at least an opcode to indicate a start a task offload operation is to be performed, and
execution circuitry to execute the decoded instruction to:
cause a transmission an offload start request to at least the second core, the offload start request including one or more of: an identifier of the first core, a location of where the second core can find the task to perform, an identifier of the second core, an instruction pointer from the code that the task is a proper subset of, a requesting core state, and a requesting core state location,
receive a response from the second core, and
update status information regarding the second core in the offload phase tracker; and
the second core comprising:
memory access circuitry to retrieve the task to perform from the location provided by the offload start request; and
execution circuitry to execute the retrieved task to perform.

Example 49. The processor of example 48, wherein the second core is not one of compute, memory, or input/output constraint bound.

Example 50. The processor of any of examples 48-49, wherein the location provided by the offload start request is in cache shared between the first core and second core.

Example 51. The processor of any of examples 48-49, wherein the location provided by the offload start request is in a memory location external to the first core and second core.

Example 52. The processor of any of examples 48-51, wherein the offload phase tracker is to be maintained by a core-to-core finite state machine.

Example 53. The processor of any of examples 48-52, wherein the performance monitoring circuitry is to track events including one or more of:
  a number of instructions of any type retired;
  a number of unhalted core cycles;
  a number of cache misses;
  a number of cache access;
  a number of branch instructions retired;
  a number of branch misses retired; and
  a number of available slots.

Example 54. The processor of any of examples 48-53, wherein the offload start request is to be transmitted to plurality of cores including the second core.

Example 55. A method comprising:
  monitoring performance of the first core using performance monitoring circuitry;
  maintaining status information about at least an availability of the second core to act as a helper core for the first core;
  decoding an instruction having fields for at least an opcode to indicate a start a task offload operation is to be performed;
  executing the decoded instruction to cause a transmission an offload start request to at least a second core, the offload start request including one or more of: an identifier of the first core, a location of where the second core can find the task to perform, an identifier of the second core, an instruction pointer from the code that the task is a proper subset of, a requesting core state, and a requesting core state location.

Example 56. The method of example 55, wherein the second core is not one of compute, memory, or input/output constraint bound.

Example 57. The method of any of examples 55-56, wherein the location provided by the offload start request is in cache shared between the first core and second core.

Example 58. The method of any of examples 55-57, wherein the location provided by the offload start request is in a memory location external to the first core and second core.

Example 59. The method of any of examples 55-58, wherein the performance monitoring circuitry is to track events including one or more of:
  a number of instructions of any type retired;
  a number of unhalted core cycles;
  a number of cache misses;
  a number of cache access;
  a number of branch instructions retired;
  a number of branch misses retired; and
  a number of available slots.

Example 60. A non-transitory machine readable medium having stored thereon an instruction which when processed by a machine is to perform any of the methods of examples 55-59.

Example 61. A processor comprising:
  a plurality of cores including at least a first and a second core;
    the first core comprising:
      performance monitoring circuitry to monitor performance of the first core,
      an offload phase tracker to maintain status information about at least an offload from the second core to the first core for the first core to act as a helper core for the second core,
      decode circuitry to decode an instruction having fields for at least an opcode to indicate an end a task offload operation is to be performed and one or more operands to provide information, and
      execution circuitry to execute the decoded instruction to:
        cause a transmission of an offload end indication to the second core, the indication including one or more of an identifier of the second core, a location of where the second core can find the results of the offload, the results of execution of the offloaded task, an instruction pointer in the original code of the second source, a requesting core state, and a requesting core state location; and
    the second core comprising:
      execution circuitry to execute the task offloaded from the first core.

Example 62. The processor of example 61, wherein the second core is not one of compute, memory, or input/output constraint bound.

Example 63. The processor of any of examples 61-62, wherein the location provided by the offload end indication is in cache shared between the first core and second core.

Example 64. The processor of any of examples 61-62, wherein the location provided by the offload end indication is in a memory location external to the first core and second core.

Example 65. The processor of any of examples 61-64, wherein the offload phase tracker is to be maintained by a core-to-core finite state machine.

Example 66. The processor of any of examples 61-65, wherein the performance monitoring circuitry is to track events including one or more of:
  a number of instructions of any type retired;
  a number of unhalted core cycles;
  a number of cache misses;
  a number of cache access;
  a number of branch instructions retired;
  a number of branch misses retired; and
  a number of available slots.

Example 67. The processor of any of examples 61-66, wherein the offload end indication is to be transmitted from the first core to plurality of cores including the second core.

Example 68. The processor of any of examples 61-67, wherein the offload end indication is not routed through an operating system.

Example 69. A processor comprising:
  a plurality of cores including at least a first and a second core;
    the first core comprising:
      performance monitoring circuitry to monitor performance of the first core,
      an offload phase tracker to maintain status information about at least an offload from the second core to the first core for the first core to act as a helper core for the second core, decode circuitry to decode an instruction having fields for at least an opcode to indicate an end a task offload operation is to be performed, and execution circuitry to execute the decoded instruction to:
cause a transmission of an offload end indication to the second core, the indication including one or more of an identifier of the second core, a location of where the second core can find the results of the offload, the results of execution of the offloaded task, an instruction pointer in the original code of the second source, a requesting core state, and a requesting core state location; and the second core comprising:
execution circuitry to execute the task offloaded from the first core.

Example 70. The processor of example 69, wherein the second core is not one of compute, memory, or input/output constraint bound.

Example 71. The processor of any of examples 69-70, wherein the location provided by the offload end indication is in cache shared between the first core and second core.

Example 72. The processor of any of examples 69-70, wherein the location provided by the offload end indication is in a memory location external to the first core and second core.

Example 73. The processor of any of examples 69-72, wherein the offload phase tracker is to be maintained by a core-to-core finite state machine.

Example 74. The processor of any of examples 69-73, wherein the performance monitoring circuitry is to track events including one or more of:
a number of instructions of any type retired;
a number of unhalted core cycles;
a number of cache misses;
a number of cache access;
a number of branch instructions retired;
a number of branch misses retired; and
a number of available slots.

Example 75. The processor of any of examples 69-74, wherein the offload end indication is to be transmitted from the first core to plurality of cores including the second core.

Example 76. The processor of any of examples 69-75, wherein the offload end indication is not routed through an operating system.

Example 77. A method comprising:
decoding an instruction having fields for at least an opcode to indicate an end a task offload operation is to be performed, and executing the decoded instruction to cause a transmission of an offload end indication to the second core, the indication including one or more of an identifier of the second core, a location of where the second core can find the results of the offload, the results of execution of the offloaded task, an instruction pointer in the original code of the second source, a requesting core state, and a requesting core state location.

Example 78. The method of example 77, wherein the second core is not one of compute, memory, or input/output constraint bound.

Example 79. The method of example 78, wherein the location provided by the offload end indication is in cache shared between the first core and second core.

Example 80. A non-transitory machine readable medium having stored thereon an instruction which when processed by a machine is to perform any of the methods of examples 55-59.

I claim:

1. A processor comprising:
a plurality of cores including at least a first and a second core;
the first core comprising:
performance monitoring circuitry to monitor performance of the first core,
core-to-core offload circuitry to:
determine an offload availability status of the first core based at least in part on values store in the performance monitoring circuitry, and
transmit an availability indication to the second core of an availability of the first core to act as a helper core to perform one or more tasks on behalf of the second core based upon the determined offload availability status of the first core,
execution circuitry to execute decoded instructions of the one or more tasks of the second core; and
the second core comprising:
execution circuitry to execute decoded instructions of the one or more tasks of the second core, and
an offload phase tracker to maintain status information about at least an availability of the first core to act as a helper core.

2. The processor of claim 1, wherein the availability indication is to include a type of availability available including one of compute, memory, and input/output.

3. The processor of claim 1, wherein the availability indication is to be periodically transmitted.

4. The processor of claim 1, wherein the availability indication is to be transmitted only when there is a determination of a change in the availability of the first core.

5. The processor of claim 1, wherein the offload phase tracker is to be maintained by a core-to-core finite state machine.

6. The processor of claim 1, wherein the performance monitoring circuitry is to track events including one or more of:
a number of instructions of any type retired;
a number of unhalted core cycles;
a number of cache misses;
a number of cache access;
a number of branch instructions retired;
a number of branch misses retired; and
a number of available slots.

7. The processor of claim 1, wherein the indication of the first core to act as a helper core to perform one or more tasks on behalf of the second core is not routed through an operating system.

8. A method comprising:
monitoring performance of a first core using performance monitoring circuitry;
determining a core-to-core offload availability status of the first core based at least in part on values store in the performance monitoring circuitry; and
transmitting an availability indication to a second core of an availability of the first core to act as a helper core to perform one or more tasks on behalf of the second core based upon the determined offload availability status of the first core.

9. The method of claim 8, wherein the availability indication is to include a type of availability available including one of compute, memory, and input/output.

10. The method of claim 8, wherein the availability indication is to be periodically transmitted.

11. The method of claim 8, wherein the availability indication is to be transmitted only when there is a determination of a change in the availability of the first core.

12. The method of claim 8, wherein the offload phase tracker is to be maintained by a core-to-core finite state machine.

13. The method of claim 8, wherein the performance monitoring circuitry is to track events including one or more of:
 a number of instructions of any type retired;
 a number of unhalted core cycles;
 a number of cache misses;
 a number of cache access;
 a number of branch instructions retired;
 a number of branch misses retired; and
 a number of available slots.

14. The method of claim 8, wherein the indication of the first core to act as a helper core to perform one or more tasks on behalf of the second core is not routed through an operating system.

15. A system comprising:
 a memory to store an offload task;
 a plurality of cores including at least a first and a second core;
 the first core comprising:
  performance monitoring circuitry to monitor performance of the first core,
  core-to-core offload circuitry to:
   determine an offload availability status of the first core to handle the stored offload task based at least in part on values store in the performance monitoring circuitry, and
   transmit an availability indication to the second core of an availability of the first core to act as a helper core to perform one or more tasks on behalf of the second core based upon the determined offload availability status of the first core,
  execution circuitry to execute decoded instructions of the one or more tasks of the second core; and
 the second core comprising:
  execution circuitry to execute decoded instructions of the one or more tasks of the second core, and
  an offload phase tracker to maintain status information about at least an availability of the first core to act as a helper core.

16. The system of claim 1, wherein the availability indication is to include a type of availability available including one of compute, memory, and input/output.

17. The system of claim 1, wherein the availability indication is to be periodically transmitted.

18. The system of claim 1, wherein the availability indication is to be transmitted only when there is a determination of a change in the availability of the first core.

19. The system of claim 1, wherein the offload phase tracker is to be maintained by a core-to-core finite state machine.

20. The system of claim 1, wherein the indication of the first core to act as a helper core to perform one or more tasks on behalf of the second core is not routed through an operating system.

* * * * *